US010473058B2

(12) United States Patent
Maqbool

(10) Patent No.: US 10,473,058 B2
(45) Date of Patent: Nov. 12, 2019

(54) SYSTEMS AND METHODS FOR IMPROVING OPERATION OF PULSE COMBUSTORS

(71) Applicant: North American Wave Engine Corporation, College Park, MD (US)

(72) Inventor: Daanish Maqbool, Hyattsville, MD (US)

(73) Assignee: North American Wave Engine Corporation, College Park, MD (US)

(*) Notice: Subject to any disclaimer, the term of this patent is extended or adjusted under 35 U.S.C. 154(b) by 924 days.

(21) Appl. No.: 15/074,609

(22) Filed: Mar. 18, 2016

(65) Prior Publication Data

US 2017/0082067 A1 Mar. 23, 2017

Related U.S. Application Data

(60) Provisional application No. 62/135,503, filed on Mar. 19, 2015, provisional application No. 62/135,473, (Continued)

(51) Int. Cl.
*F02K 7/04* (2006.01)
*F02K 7/06* (2006.01)
(Continued)

(52) U.S. Cl.
CPC ............... *F02K 7/04* (2013.01); *F02C 5/10* (2013.01); *F02C 5/12* (2013.01); *F02C 9/28* (2013.01);
(Continued)

(58) Field of Classification Search
CPC ..... F23R 7/00; F02K 7/02; F02K 7/04; F02K 7/06; F23C 2205/10; F23C 2205/00;
(Continued)

(56) References Cited

U.S. PATENT DOCUMENTS 2,480,626 A 8/1949 Bodine
2,543,758 A 3/1951 Bodine
(Continued)

FOREIGN PATENT DOCUMENTS

CN 85101521 A 1/1987
DE 102013216398 A1 2/2015
(Continued)

OTHER PUBLICATIONS

Blomquist, C. A., "Experimental Gas-Fired Pulse-Combustion Studies", prepared for Jet Propulsion Laboratory, for U.S. Department of Energy, Argonne National Laboratory, ANL/EES-TM-214, pp. 1-314, Sep. 1982 (313 pages—full document).
(Continued)

*Primary Examiner* — Steven M Sutherland
*Assistant Examiner* — Thuyhang N Nguyen
(74) *Attorney, Agent, or Firm* — Wilmer Cutler Pickering Hale and Dorr LLP

(57) ABSTRACT

A pulse combustor system for reducing noise and/or vibration levels. The system includes a pulse combustor including a combustion chamber, an inlet pipe, an exhaust pipe, and a first fuel injector for injecting fuel into the combustion chamber. The pulse combustor has a fundamental oscillation mode and one or more additional oscillation modes. The system includes at least one pressure sensor for measuring a pressure inside the fuel combustor and/or a at least one fluid velocity sensor for measuring fluid velocity at the inlet pipe or at the exhaust pipe. A controller adjusts a rate of fuel supply to the pulse combustor if the measured pressure and/or the measured velocity is above a predetermined threshold value to reduce excitation of the one or more additional oscillation modes.

25 Claims, 27 Drawing Sheets

Related U.S. Application Data filed on Mar. 19, 2015, provisional application No. 62/135,332, filed on Mar. 19, 2015.

(51) Int. Cl.

| | | |
|---|---|---|
| *F02C 5/10* | (2006.01) | |
| *F02C 9/28* | (2006.01) | |
| *F02K 7/02* | (2006.01) | |
| *F02C 5/12* | (2006.01) | |
| *F23N 1/00* | (2006.01) | |
| *F23C 6/02* | (2006.01) | |
| *F23R 7/00* | (2006.01) | |
| *F23C 15/00* | (2006.01) | |

(52) U.S. Cl.
CPC .................. *F02K 7/02* (2013.01); *F02K 7/06* (2013.01); *F23C 6/02* (2013.01); *F23C 15/00* (2013.01); *F23N 1/00* (2013.01); *F23R 7/00* (2013.01); *F05D 2230/60* (2013.01); *F05D 2260/96* (2013.01); *F05D 2270/80* (2013.01); *F23C 2205/10* (2013.01); *F23R 2900/00013* (2013.01); *F23R 2900/00014* (2013.01)

(58) Field of Classification Search
CPC .... F02C 9/266; F02C 9/28; F02C 5/10; F02C 5/12; F05D 2270/14
See application file for complete search history.

(56) References Cited

U.S. PATENT DOCUMENTS

| | | | |
|---|---|---|---|
| 2,731,795 A | 1/1956 | Bodine | |
| 2,750,733 A | 6/1956 | Paris | |
| 2,796,734 A * | 6/1957 | Bodine, Jr. ............... | F02K 7/04 60/249 |
| 2,834,181 A | 5/1958 | Paris | |
| 2,838,102 A | 6/1958 | Reimers | |
| 2,872,780 A | 2/1959 | Schmidt | |
| 3,185,871 A | 5/1965 | Bodine, Jr. | |
| 3,606,867 A | 9/1971 | Weissinger | |
| 3,768,926 A | 10/1973 | Pegg et al. | |
| 4,314,444 A | 2/1982 | Putnam et al. | |
| 4,840,558 A | 6/1989 | Saito et al. | |
| 6,640,549 B1 * | 11/2003 | Wilson ...................... | F02C 5/00 60/39.281 |
| 6,793,174 B2 | 9/2004 | Ouellette et al. | |
| 7,637,096 B2 * | 12/2009 | Razzell ..................... | F02C 5/11 60/247 |
| D757,859 S | 5/2016 | Goitein | |
| D759,764 S | 6/2016 | Lai | |
| 9,527,588 B1 | 12/2016 | Rollefstad | |
| D784,854 S | 4/2017 | Huang et al. | |
| D795,785 S | 8/2017 | Morrison et al. | |
| D800,602 S | 10/2017 | Hsiao et al. | |
| D801,223 S | 10/2017 | Hsiao et al. | |
| D808,860 S | 1/2018 | Tian et al. | |
| D809,992 S | 2/2018 | Hu et al. | |
| D816,582 S | 5/2018 | Liang et al. | |
| 2012/0083945 A1 | 4/2012 | Oakley et al. | |
| 2012/0131901 A1 * | 5/2012 | Westervelt ............. | F02C 9/266 60/204 |
| 2012/0204534 A1 | 8/2012 | Kenyon et al. | |
| 2014/0339355 A1 | 11/2014 | Olm et al. | |
| 2016/0001879 A1 | 1/2016 | Johannesson et al. | |
| 2017/0144756 A1 | 5/2017 | Rastgaar Aagaah et al. | |
| 2017/0152035 A1 | 6/2017 | Zhao et al. | |
| 2017/0210470 A1 | 7/2017 | Pardell | |
| 2017/0297707 A1 | 10/2017 | Rollefstad et al. | |
| 2018/0065735 A1 | 3/2018 | Ichihara | |

FOREIGN PATENT DOCUMENTS

| | | |
|---|---|---|
| EP | 1348908 A2 | 10/2003 |
| EP | 2642204 A1 | 9/2013 |
| GB | 781482 A | 8/1957 |

OTHER PUBLICATIONS

International Search Report and Written Opinion issued by the European Patent Office as International Searching Authority for International Application No. PCT/US2016/067242 dated May 18, 2017 (14 pages).

International Search Report and Written Opinion issued by the U.S. Patent and Trademark Office as International Searching Authority for International Application No. PCT/US2016/023241 dated Nov. 29, 2016 (6 pages).

Ipakchi, H., "Development and Performance Characteristics of a Family of Gas-Fired Pulsed Combustors", Thesis for Middlesex University School of Engineering Systems, Jun. 2000 (291 pages—full document).

Reynst, François H., "Pulsating Combustion," Pergamon Press, 6 pages—Cover pages, Copyright pages, Table of Contents and pp. 208-209 (1961).

Evans, R.G. et al., "Pulse Jet Orchard Heater System Development: Part I. Design, Construction, and Optimization", Transactions of the ASABE, 52(2):331-343, 2009 (13 pages).

Heutschi, K., "Acoustics II: electrical-mechanical-acoustical analogies", Eidgenössische Technische Hochschule Zürich, Swiss Federal Institute of Technology Zurich, Jan. 18, 2013 (91 pages).

Poinsot, T.J. et al., "Vortex-driven acoustically coupled combustion instabilities", J. Fluid Mech., 177:265-292, 1987 (28 pages).

Zheng, F. et al., "A New Acoustic Model for Valveless Pulsejets and Its Application to Optimization Thrust", Journal of Engineering for Gas Turbines and Power, 130:041501-1-041501-9, Jul. 2008 (9 pages).

International Search Report and Written Opinion issued by the European Patent Office as Searching Authority in International Application No. PCT/US2016/023238, dated Dec. 5, 2016 (13 pages).

\* cited by examiner

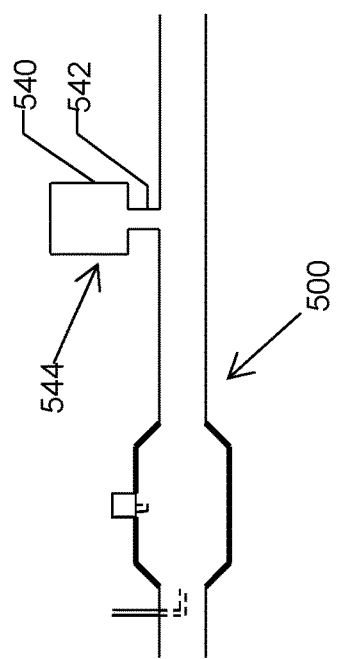

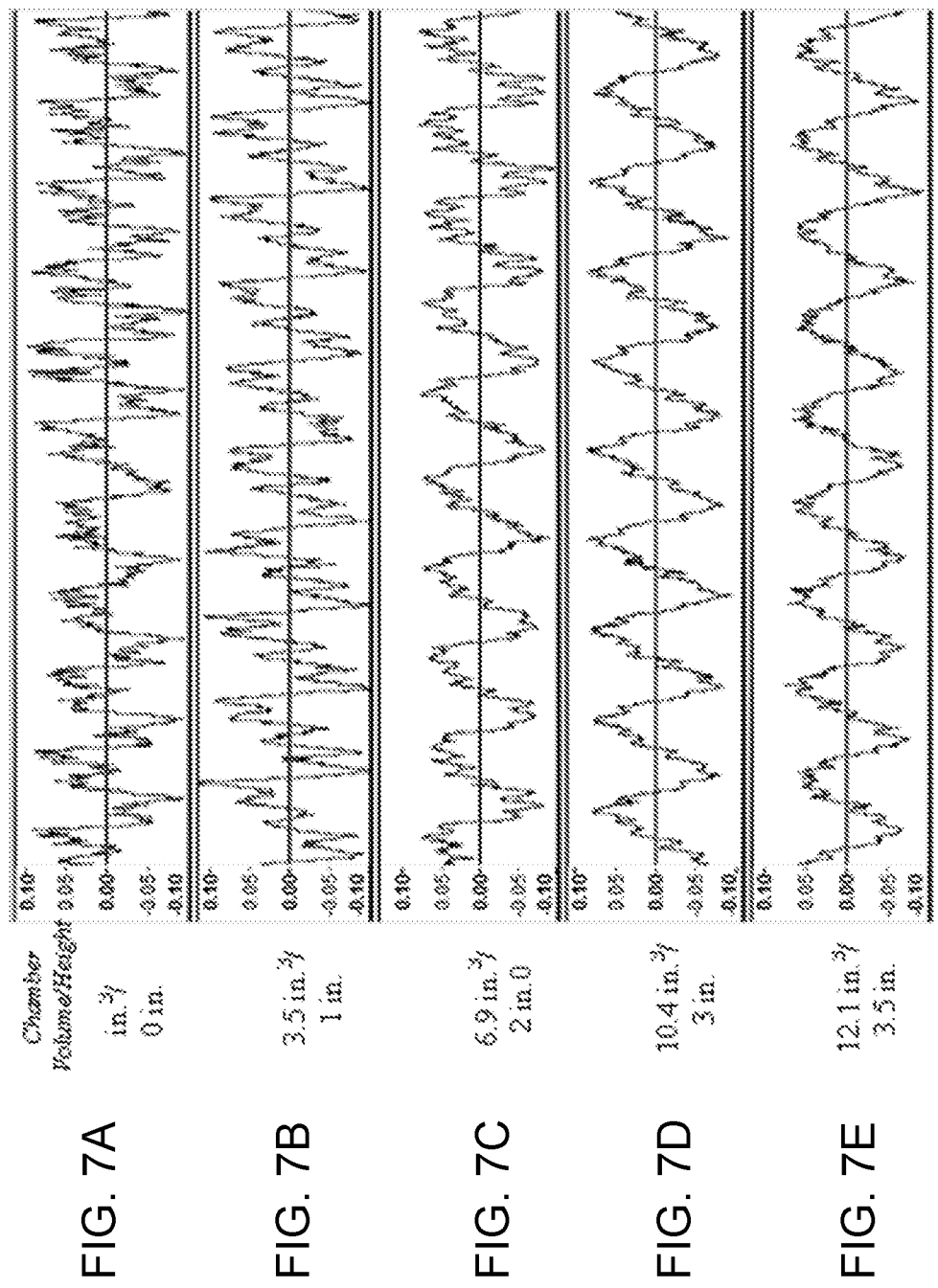

SYSTEMS AND METHODS FOR IMPROVING OPERATION OF PULSE COMBUSTORS

CROSS-REFERENCE TO RELATED APPLICATIONS

This application claims benefit under 35 U.S.C. 119(e) to U.S. Provisional Patent Application No. 62/135,503, filed on Mar. 19, 2015, U.S. Provisional Patent Application No. 62/135,473, filed on Mar. 19, 2015, and U.S. Provisional Patent Application No. 62/135,332, filed on Mar. 19, 2015, the entirety of each of which is explicitly incorporated by reference herein.

All publications, patent applications, patents, and other references mentioned herein are incorporated by reference in their entirety. The patent and scientific literature referred to herein establishes knowledge that is available to those skilled in the art. The issued patents, applications, and other publications that are cited herein are hereby incorporated by reference to the same extent as if each was specifically and individually indicated to be incorporated by reference. In the case of inconsistencies, the present disclosure will prevail.

TECHNICAL FIELD

The present disclosure relates to combustors and jet engines. More specifically, the present disclosure relates to pulse combustors and pulsejet engines and their operation.

BACKGROUND

A typical pulse combustor (or pulsejet engine) consists of a combustion chamber, an inlet pipe, a fuel injector, a spark plug (or other ignition means), and an exhaust pipe. The combustion chamber, inlet pipe and exhaust pipe are often cylindrical, but are not limited to such geometry and can take on a variety of shapes. The diameter of the inlet and exhaust pipes is generally smaller than the diameter of the combustion chamber, and the length of the inlet pipe is generally significantly smaller than the length of the exhaust pipe.

The advantages of pulse combustors include their ability draw in fresh air and sustain operation without any external machinery or moving parts. Pulse combustors can also be used as thrust-producing devices, in which case they are commonly referred to as "pulsejet" or "pulse jet" engines. Pulsejet engines have been in use for a long time and have been used to propel several types of aircraft over the last century. Pulsejet engines are often characterized by a diverging exhaust pipe to aid in thrust production.

Pulsejet engines are characterized by their simplicity, particularly because of the lack of moving parts. However, the oscillating nature of the flows into and out of the pulsejet engines tends to produce very high noise and vibration levels that have often been cited as the most serious hurdles in the widespread implementation of pulsejet engines. One particular goal in developing improved pulsejet engines is addressing the high noise and vibration levels. Further, another goal in developing improved pulsejet engines is improving efficiency, mechanical energy conversion, and/or thrust from pulsejet engines.

A proposed application for pulsejet engines involves aircraft with Vertical Take-Off and Landing (VTOL) capability, for example, such as that proposed in U.S. Pat. No. 6,793,174 B2. In such an aircraft, an array of pulsejet engines mounted under/inside the fuselage/airframe provide vertical lift for takeoff and landing. However, arrays of pulsejet engines produce high noise and vibration levels, which prevents their widespread implementation. A further goal in developing improved pulsejet engines is addressing the high noise and vibration levels produced by two or more pulsejet engines.

It has previously been proposed that one way to counter the oscillating nature of a pulsejet engine is to operate two pulsejet engines simultaneously but in anti-phase. In this manner, the oscillating nature of one pulsejet engine is countered by the other. An arrangement to produce such operation between two pulsejet engines has been designed and tested by several researchers, for example, in U.S. Pat. No. 4,840,558 A. This arrangement requires the exhaust pipes of two pulsejet engines to be connected via a chamber with relatively large volume and/or requires the inlet pipes of two pulsejet engines to be connected via a chamber with a relatively large volume. These connecting chambers are often referred to as 'decoupling chambers'. While this arrangement has been successful in producing anti-phase operation, it also has the detrimental effect of reducing oscillation pressure amplitude of the engines, as has been noted by several researchers, including, for example, R. G. Evans and A. S. Alshami in their paper Pulse Jet Orchard Heater System Development: Part I. Design, Construction, and Optimization, the disclosure of which is incorporated herein by reference in its entirety. This loss of oscillation pressure amplitude manifests itself as a reduction in useful mechanical power output, or in the case of a thrust-producing pulsejet, as a loss of thrust. The loss of pressure amplitude can occur for several reasons, one of which is that the insertion of a decoupling chamber between the intake pipe and the atmosphere provides higher resistance to flow drawn into the combustion chamber from the atmosphere, as compared to the case with no decoupling chamber. The result is that a smaller amount of air enters the chamber for a given pressure difference between the combustion chamber and the atmosphere, resulting in lower amounts of fuel that can be burned, and subsequently, lower energy release per cycle. Similarly, the insertion of a decoupling chamber between the exhaust pipes of pulsejets impedes the high-velocity exhaust gases, also leading to thrust loss.

None of the prior tools are especially well optimized for operating two pulsejet engines (or pulse combustors) in anti-phase. One goal in developing improved systems and methods for operation of pulsejet engines (or pulse combustors) is to provide an arrangement which would produce anti-phase operation between two pulsejet engines (or pulse combustors) with minimal interference in the operation of the individual pulsejet engines (or pulse combustors).

SUMMARY

The present disclosure relates to a pulsejet engine (or a pulse combustor) with a controllable fuel supply. An electronic control system uses information from pressure and/or velocity sensors to detect the presence of harmonics (higher modes of oscillation) in the pulsejet engine (or pulse combustor), and accordingly adjusts the fuel injection profile (versus time) to affect the heat release rate and minimize the presence (excitation) of higher modes of oscillation and associated harmonic content. The heat release profile can also be manipulated to minimize harmonic content due to large amplitude effects in the pressure wave.

The periodic heat release in a pulsejet engine (or pulse combustor) contains significant harmonic content. The energy in high frequencies (frequencies above the fundamental) can excite higher modes of oscillation within a pulsejet engine (or pulse combustor), resulting in high frequency content in pressure and velocity fluctuations in a pulsejet engine (or pulse combustor). This high frequency content is largely responsible for perceived noise, and the minimization of higher modes of oscillation can reduce or remove this high frequency content to produce lower noise and vibration levels from pulsejet engines (or pulse combustors). In some embodiments, the pressure and/or velocity sensors allow for operation of a pulsejet engine (or several pulsejet engines in combination) without exciting harmonics/high frequency modes inside the engine. In some embodiments, the pressure and/or velocity sensors enable tailoring of the heat release profile, or the forcing function, to only excite the fundamental, lowest-frequency operation mode.

In some embodiments, the present disclosure relates to acoustic resonator(s) attached to a pulsejet engine (or pulse combustor). The acoustic resonator(s) may be tuned to the same respective frequencies as the frequencies of modes of oscillation that are to be damped or (mathematically) eliminated. This arrangement can damp or render inaccessible the prescribed modes of oscillation in a pulsejet engine (or pulse combustor). In some embodiments the resonator is tuned to a desired frequency by adjusting the volume of the resonator.

The periodic heat release in a pulse jet engine (or pulse combustor) typically contains significant harmonic content. The energy in high frequencies (frequencies above the fundamental frequency) can excite higher modes of oscillation within a pulsejet engine (or pulse combustor), resulting in high frequency content in pressure and velocity fluctuations in a pulsejet engine (or pulse combustor). This high frequency content is largely responsible for perceived noise, and the damping of higher modes of oscillation by acoustic resonators as discussed herein can reduce or remove this high frequency content to produce lower noise and vibration levels from pulsejet engines (or pulse combustors). In some embodiments, a single acoustic resonator is used. In some embodiments, two or more acoustic resonators are used.

In some embodiments, the present disclosure relates to two or more pulsejet engines (or pulse combustors) connected to one another at their combustion chambers by means of connecting tubes. The length of the connecting tubes may be significantly shorter than the wavelength corresponding to the periodic operation of each pulse combustor. In some embodiments, $l < \lambda/8$. In some embodiments, where the pulsejet engines (or pulse combustors) are connected to each other at their combustion chambers by a tube having a length that is significantly shorter than the wavelength corresponding to the periodic operation, the pulsejet engines (or pulse combustors) operate in-phase.

In some embodiments, in an array of pulsejet engines (or pulse combustors), lower vibration and noise levels can be achieved with destructive interference of the force and acoustic pressure waves/signals, respectively. Producing destructive interference can require half the pulsejet engines (or pulse combustors) in the array to operate in anti-phase with respect to the other half. In some embodiments, two or more pulsejet engines (or pulse combustors) operate in-phase, so that they may be collectively operated against another group of pulsejet engines (or pulse combustors) to produce destructive interference.

In some embodiments, the present disclosure relates to two pulsejet engines (or pulse combustors) connected to each other at their combustion chambers by means of a connecting tube. The length of the connecting tube may corresponds to half a wavelength of the periodic operation of each pulsejet engine (or pulse combustor). In some embodiments, two pulsejet engines (or pulse combustors) connected to each other via a tube having a length corresponding to half a wavelength of the periodic operation of each pulsejet engine (or pulse combustor) operate in anti-phase.

Some embodiments of the present disclosure relate to operating two pulsejet engines (or pulse combustors) connected to each other via a tube having a length corresponding to half a wavelength of the periodic operation of each pulsejet engine (or pulse combustor), producing less noise and vibration than a single pulsejet engine (or pulse combustor) or two uncoupled pulsejet engines (or pulse combustors) because the oscillatory flow of one pulsejet engine (or pulse combustor) is countered by the oscillatory flow of the other. The unsteadiness of the combined system is less than the unsteadiness of a single pulsejet engine (or pulse combustor) or two uncoupled pulsejet engines (or pulse combustors), which results in reduced noise and vibration levels.

One aspect discussed herein relates to a pulse combustor system. The pulse combustor system includes a first pulse combustor, including a combustion chamber, an inlet pipe, an exhaust pipe, and a first fuel injector for injecting fuel into the combustion chamber at a fuel supply rate. The first pulse combustor has a fundamental oscillation mode and one or more additional oscillation modes. The pulse combustor includes at least one of: at least one pressure sensor and a first fluid velocity sensor for measuring a first fluid velocity at the inlet pipe and a second fluid velocity sensor for measuring a second fluid velocity at the exhaust pipe. If the pressure is above a predetermined pressure value, the at least one pressure sensor sends a signal to a controller to adjust a fuel supply rate to the pulse combustor to reduce excitation of the one or more additional oscillation modes (e.g., the controller determines whether to adjusts the fuel supply rate in response to the signal). If the first fluid velocity is above a predetermined fluid velocity value, the first fluid velocity sensor sends a signal to a controller to adjust a fuel supply rate to the pulse combustor to reduce excitation of the one or more additional oscillation modes (e.g., the controller determines whether to adjusts the fuel supply rate in response to the signal). If the second fluid velocity is above a predetermined fluid velocity value, the second fluid velocity sensor sends a signal to a controller to adjust a fuel supply rate to the pulse combustor to reduce excitation of the one or more additional oscillation modes (e.g., the controller determines whether to adjusts the fuel supply rate in response to the signal).

In some embodiments, the pulse combustor includes at least one pressure sensor. In some embodiments, the pulse combustor system includes one fluid velocity sensor. In some embodiments, the pulse combustor system includes two fluid velocity sensors. In some embodiments, the pulse combustor includes multiple pressure sensors and multiple fluid velocity sensors.

In some embodiments, the sensor or sensors (e.g., pressure sensor(s), fluid velocity sensor(s)) continuously send signals to the controller. In some embodiments, the signals include information regarding the measured pressure or velocity (e.g., values of measured pressure or velocity). In some embodiments, the controller determines whether a fuel rate to the pulse combustor needs to be adjusted in response to the signal(s) received from the sensor(s). In some embodiments, the controller adjusts the fuel rate to the pulse combustor if the measured pressure and/or velocity value exceeds a predetermined threshold.

In some embodiments, the system includes a second fuel injector for injecting fuel into the combustion chamber.

In some embodiments, the system includes the first pressure sensors, wherein if the pressure is above the predetermined pressure value, the at least one pressure sensor sends a signal to the controller to adjust the fuel supply rate to the pulse combustor to reduce excitation of the one or more additional oscillation modes. In some embodiments, the controller receives the signal from the first pressure sensor and makes a determination whether the fuel supply rate to the pulse combustor needs to be adjusted. In some embodiments, the first pressure sensor reduces excitation of a first additional oscillation mode of the one or more additional oscillation modes, the first pressure sensor being located at a pressure anti-node of the first additional oscillation mode.

In some embodiments, the fuel supply rate corresponds to a frequency of the fundamental oscillation mode, wherein the controller superimposes a first pulsing profile on the fuel supply rate. In some embodiments, the first pulsing profile corresponds to a first frequency of the first additional oscillation mode. In some embodiments, the controller determines the fuel supply rate, e.g., to optimize/reduce fuel consumption. In some embodiments, the controller determines the first pulsing profile.

In some embodiments, the controller adjusts a second fuel supply rate of the second fuel injector to correspond to a first frequency of the first additional oscillation mode.

In some embodiments, the system includes the first and/or the second fluid velocity sensors, wherein if the first fluid velocity and/or the second fluid velocity is above the predetermined fluid velocity value, the first and/or the second fluid velocity sensor sends a signal to the controller to adjust the fuel supply rate to the pulse combustor to reduce excitation of the one or more additional oscillation modes.

In some embodiments, at least one of the first fluid velocity sensor and the second fluid velocity sensor reduces excitation of a second additional oscillation mode of the one or more additional oscillation modes, at least one of the first and the second fluid velocity sensors being located at a velocity anti-node of the second additional oscillation mode. In some embodiments, the first velocity sensor is located at the inlet pipe. In some embodiments, the second velocity sensor is located at the exhaust pipe.

In some embodiments, the fuel supply rate corresponds to a frequency of the fundamental oscillation mode. In some embodiments, the controller superimposes a second pulsing profile on the fuel supply rate. In some embodiments, the second pulsing profile corresponds to a second frequency of the second additional oscillation mode. In some embodiments, the controller adjusts the second fuel supply rate of the second fuel injector to correspond to a second frequency of the second additional oscillation mode. In some embodiments, the controller calculates the second pulsing profile.

In some embodiments, the system includes a resonator tuned to a third frequency of a third of the one or more additional oscillation modes. In some embodiments, the resonator attenuates the third frequency of operation of the first pulse combustor.

In some embodiments, the resonator is a Helmholtz resonator, a quarter-wave tube, or a sixth-wave tube. In some embodiments, the resonator is attached to the exhaust pipe. In some embodiments, the resonator is located at a pressure anti-node of the third additional oscillation mode. In some embodiments, the system includes one resonator. In some embodiments, the system includes two or more resonators (e.g., each of the same type or of different types).

A further aspect discussed herein relates to a pulse combustor system. In some embodiments, the pulse combustor system includes a first pulse combustor (e.g., arranged as discussed in any embodiments herein) and a second pulse combustor (e.g., arranged as the first pulse combustor). The first pulse combustor is connected to the second pulse combustor by a connecting tube. The connecting tube is attached at a first end to the first pulse combustor combustion chamber and at a second end to the second pulse combustor combustion chamber. The tube has a length that is less than or equal to $1/8^{th}$ of a wavelength of the fundamental oscillation mode.

In some embodiments, the length of the connecting tube causes the first pulse combustor and the second pulse combustor to operate in-phase.

In some embodiments, the length of the connecting tube prevents air flow between the first engine and the second engine during operation of the pulse combustor system.

In some embodiments, the pulse combustor system includes three or more pulse combustors, wherein each of the three or more pulse combustors is arranged as the first pulse combustor, and wherein each pulse combustor is connected to one or two pulse combustors of the three or more pulse combustors by a tube arranged as the connecting tube.

Another aspects discussed herein relates to a method of reducing noise and/or vibration in a pulsejet system. The method includes controlling a rate of fuel supply to a first pulse combustor by a controller. The first pulse combustor includes a first combustion chamber, a first inlet pipe, a first exhaust pipe, and a first fuel injector for injecting fuel into the first combustion chamber. The first pulse combustor has a fundamental oscillation mode and one or more additional oscillation modes. The controller adjusts a fuel supply rate to the first pulse combustor to reduce excitation of the one or more additional oscillation modes in response to receiving a signal indicating occurrence of at least one predetermined condition. In some embodiments, the signal is received from at least one of: at least one pressure sensor attached to the first pulse combustor for measuring a pressure inside the fuel combustor, wherein the at least one predetermined condition includes the measured pressure inside the fuel combustor exceeding a predetermined threshold pressure value; and at least one fluid velocity sensor attached to the first pulse combustor for measuring a fluid velocity at the inlet pipe or at the outlet pipe, wherein the at least one predetermined condition includes the measured fluid velocity at the inlet pipe or at the outlet pipe exceeding a predetermined threshold fluid velocity value.

In some embodiments, the controller receives the signal from the at least one pressure sensor located at a pressure anti-node of a first additional oscillation mode of the one or more additional oscillation modes, wherein the controller calculates a first pulsing profile corresponding to a first frequency of the first additional oscillation mode to reduce excitation of the first oscillation mode.

In some embodiments, the controller adjusts the fuel supply rate to the first pulse combustor by superimposing the first pulsing profile on a first fuel supply rate of the first fuel injector.

In some embodiments, the first pulse combustor includes a second fuel injector for injecting fuel into the combustion chamber, wherein the controller adjusts the fuel supply rate to the first pulse combustor by adjusting a second fuel supply rate of the second fuel injector to correspond to the first pulsing profile.

In some embodiments, the controller receives the signal from the at least one velocity sensor located at a velocity anti-node of a second additional oscillation mode of the one or more additional oscillation modes, wherein the controller calculates a second pulsing profile corresponding to a second frequency of the second additional oscillation mode to reduce excitation of the second oscillation mode.

In some embodiments, the controller adjusts the fuel supply rate to the first pulse combustor by superimposing the second pulsing profile on a first fuel supply rate of the first fuel injector.

In some embodiments, the first pulse combustor includes a third fuel injector for injecting fuel into the combustion chamber, wherein the controller adjusts the fuel supply rate to the first pulse combustor by adjusting a third fuel supply rate of the third fuel injector to correspond to the second pulsing profile.

Another aspects discussed herein relates to a method of reducing noise and/or vibration in a pulsejet system. The method includes providing a first pulse combustor, where the first combustor includes a first combustion chamber, a first inlet pipe, a first exhaust pipe, and a first fuel injector for injecting fuel into the first combustion chamber. The first pulse combustor has a fundamental oscillation mode and one or more additional oscillation modes. The method includes attaching at least one resonator to the first pulse combustor. The method includes adjusting a size of the resonator to adjust a resonant frequency of the resonator to correspond to a first frequency of a first oscillation mode of the one or more additional oscillation modes to reduce excitation of the first oscillation mode.

In some embodiments, the attaching includes determining a location of a pressure anti-node of the first oscillation mode and attaching the at least one resonator at the location corresponding to the pressure anti-node of the first oscillation mode.

In some embodiments, adjusting the size of the resonator includes adjusting a volume of the resonator to reduce excitation of the first oscillation mode.

In some embodiments, adjusting the size of the resonator comprises adjusting a length of the resonator to reduce excitation of the first oscillation mode.

In some embodiments, the method includes determining a location of a pressure node of a second oscillation mode of the one or more oscillation modes, wherein the second oscillation mode has a second frequency that is different from the first frequency; attaching a second resonator to the first pulse combustor at a location corresponding to a pressure anti-node of the second oscillation mode; and adjusting a size of the second resonator to minimize excitation of the second oscillation mode.

In some embodiments, the method includes attaching a second pulse combustor to a first pulse combustor by a tube having a first end and a second end, the second pulse combustor being arranged as the first pulse combustor, wherein the first end is attached to the first combustion chamber and the second end is attached to a combustion chamber of the second pulse combustor, wherein the tube has a length that is less than or equal to $1/8^{th}$ of a wavelength of the fundamental oscillation mode.

A further aspect discussed herein relates to a method of reducing noise and/or vibration in a pulse combustor system. The method includes providing a first pulse combustor including a first combustion chamber, a first inlet pipe, a first exhaust pipe, and a first fuel injector for injecting fuel into the combustion chamber. The method also includes providing a second pulse combustor including a second combustion chamber, a second inlet pipe, a second exhaust pipe, and a second fuel injector for injecting fuel into the combustion chamber. The first pulse combustor and the second pulse combustor have a fundamental oscillation mode and one or more additional oscillation modes when operated in isolation. The method also includes connecting the first pulse combustor to the second pulse combustor by attaching a first end of the connecting tube to the first combustion chamber and a second end of the connecting tube to the second combustion chamber. The connecting tube has a length that is less than or equal to $1/8^{th}$ of a wavelength of the fundamental oscillation mode.

Another aspect discussed herein relates to a pulse combustor system, including a first pulse combustor. The first pulse combustor includes a combustion chamber, an inlet pipe, an exhaust pipe, and a first fuel injector for injecting fuel into the combustion chamber at a fuel supply rate. The first pulse combustor has a fundamental oscillation mode and one or more additional oscillation modes. A first resonator is attached to the first pulse combustor. The first resonator has dimensions selected such that a first resonant frequency of the first resonator corresponds to a first frequency of a first oscillation mode of the one or more additional oscillation modes, wherein the first resonator reduces excitation of the first oscillation mode.

In some embodiments, the first resonator is attached to the first pulse combustor at a location corresponding to a pressure anti-node of the first oscillation mode.

In some embodiments, the pulse combustor system includes a second resonator attached to the first pulse combustor, the second resonator having dimensions selected such that a second resonant frequency of the second resonator corresponds to a second frequency of a second oscillation mode of the one or more additional oscillation modes. In some embodiments, the second resonator reduces excitation of the second oscillation mode, wherein the second resonator is attached to the first pulse combustor at a location corresponding to a pressure anti-node of the second oscillation mode.

A further aspect discussed herein relates to a pulse combustor system including a first pulse combustor system and a second pulse combustor system. The first pulse combustor includes a first combustion chamber, a first inlet pipe, a first exhaust pipe, and a first fuel injector for injecting fuel into the combustion chamber. The second pulse combustor includes a second combustion chamber, a second inlet pipe, a second exhaust pipe, and a second fuel injector for injecting fuel into the combustion chamber. The first pulse combustor and the second pulse combustor have a fundamental oscillation mode and one or more additional oscillation modes when operated in isolation. The pulse combustor system includes a tube connecting the first pulse combustor combustion chamber to the second pulse combustor combustion chamber. The tube has a length that is less than or equal to $1/8^{th}$ of a wavelength of the fundamental oscillation mode.

In some embodiments, the first pulse combustor includes a first resonator attached thereto and the second pulse combustor includes a second resonator attached thereto, the first resonator being identical to the second resonator.

In some embodiments, each of the first resonator and the second resonator have dimensions selected such that a resonant frequency of the first and the second resonator corresponds to a first frequency of a first oscillation mode of the one or more additional oscillation modes, wherein each of the first and the second resonator reduces excitation of the first oscillation mode.

In some embodiments, the first resonator is attached to the first pulse combustor at a location on the first pulse combustor corresponding to a pressure anti-node of the first oscillation mode and the second resonator is attached to the second pulse combustor at a location on the second pulse combustor corresponding to a pressure anti-node of the first oscillation mode.

One aspect discussed herein relates to a pulse combustor system. The pulse combustor system includes a first pulse combustor and a second pulse combustor. The first pulse combustor includes a first combustion chamber, a first inlet pipe, a first exhaust pipe, and a first fuel injector for injecting fuel into the combustion chamber. The second pulse combustor includes a second combustion chamber, a second inlet pipe, a second exhaust pipe, and a second fuel injector for injecting fuel into the combustion chamber. The first pulse combustor and the second pulse combustor have a fundamental oscillation mode and one or more additional oscillation modes when operated in isolation. A tube connects the first pulse combustor combustion chamber to the second pulse combustor combustion chamber. The tube has a length corresponding to ½ of the fundamental oscillation mode wavelength.

In some embodiments, the pulse combustor system reduces exchange of gas between the connecting tube and the combustion chambers of the first and second pulse combustors during operation. In some embodiments, no gas travels from the connecting tube into the second pulse combustion chamber. In some embodiments, no gas travels into the connecting tube from the second pulse combustor.

In some embodiments, the tube has a first end connected to the first pulse combustor and a second end connected to the second pulse combustor, wherein the first end has a first oscillating pressure and the second end has a second oscillating pressure, wherein the second oscillating pressure is an opposite of the first oscillating pressure. In some embodiments, the first end and the second end are pressure anti-nodes during operation. In some embodiments, a center of the connecting tube is a pressure node during operation. In some embodiments, the first end and the second end are velocity nodes during operation. In some embodiments, the connecting tube has a tube oscillation mode frequency corresponding to a frequency of the fundamental oscillation mode during operation.

In some embodiments, the length of the connecting tube causes the first pulse combustor and the second pulse combustor to operate in anti-phase.

In some embodiments, oscillations of the first pulse combustor are countered by oscillations of the second pulse combustor, wherein the pulse combustor system produces reduced noise and vibration levels compared to operation of a single pulsejet combustor engine in isolation.

In some embodiments, the connecting tube is U-shaped.

A further aspect discussed herein relates to a method of reducing noise and/or vibration in a pulse combustor system. The method includes providing a first pulse combustor and a second pulse combustor. The first pulse combustor includes a first combustion chamber, a first inlet pipe, a first exhaust pipe, and a first fuel injector for injecting fuel into the combustion chamber. The second pulse combustor includes a second combustion chamber, a second inlet pipe, a second exhaust pipe, and a second fuel injector for injecting fuel into the combustion chamber. The first pulse combustor and the second pulse combustor have a fundamental oscillation mode and one or more additional oscillation modes when operated in isolation. The method also includes connecting the first pulse combustor to the second pulse combustor by attaching a first end of the connecting tube to the first combustion chamber and a second end of the connecting tube to the second combustion chamber. The connecting tube has a length corresponding to ½ of the fundamental oscillation mode wavelength.

Elements of embodiments described with respect to a given aspect of the disclosure may be used in various embodiments of another aspect of the disclosure. For example, it is contemplated that features of dependent claims depending from one independent claim can be used in apparatus and/or methods of any of the other independent claims.

BRIEF DESCRIPTION OF FIGURES

The foregoing and other objects, aspects, features, and advantages of the present disclosure will become more apparent and better understood by referring to the following description taken in conjunction with the accompanying drawings, in which:

FIG. 5 is a setup of a possible embodiment of the present disclosure, according to some aspects of the present disclosure.

FIG. 7A-E shows plots of microphone signals for pulse combustors with attached resonators of different volumes, according to some aspects of the present disclosure.

Figure 1:
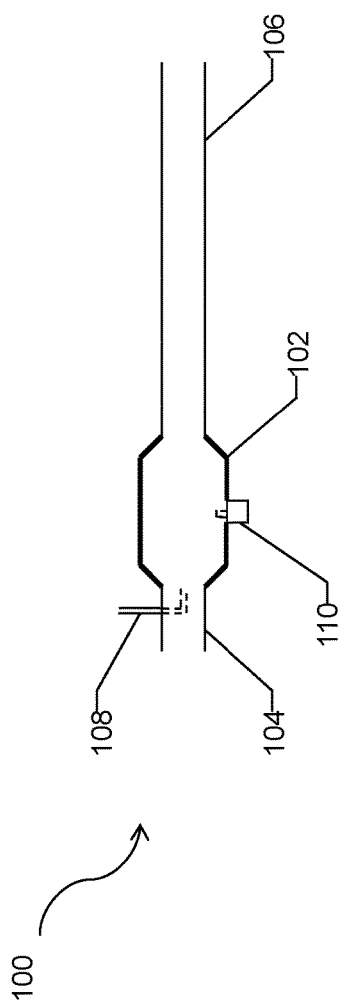
FIG. 1 is a setup of a typical conventional pulse combustor.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

In this document, "pulse combustor", "pulse jet engine", "pulse jet", "pulsejet engine" or "pulsejet" refer to the same device. It is understood that a pulsejet or pulsejet engine is a pulse combustor that is used for thrust production.

Some embodiments disclosed herein relate to systems and methods for reducing noise and/or vibration levels and increasing efficiency during operation of pulse combustors. In some embodiments, pressure and/or velocity sensor(s) are used to measure pressure and/or velocity in the pulse combustor. The pressure and/or velocity sensors measure pressure and/or velocity in the combustor and send signals to a controller (e.g., electronic control system) regarding the measured pressure and/or velocity values. If the controller determines that the measured pressure and/or velocity values exceed predetermined thresholds, the controller adjusts a fuel supply rate to the pulse combustor to thereby reduce/eliminate excitation of undesirable oscillation modes of the pulse combustor (e.g., oscillation modes other than the fundamental oscillation mode of the combustor). In some embodiments, the controller calculates a suitable pulsing profile that may be used to reduce/eliminate undesirable oscillation modes in response to receiving the signal(s) from the pressure and/or velocity sensor(s). In some embodiments, a pressure sensor is placed at a pressure anti-node of the undesirable oscillation mode that is being reduced/eliminated. In some embodiments, a velocity sensor is placed at a velocity anti-node of the undesirable oscillation mode that is being reduced/eliminated.

In some embodiments, the present disclosure relates to systems and methods using acoustic resonators (e.g., Helmholtz resonators, quarter-wave tubes, sixth wave tubes) to reduce noise and/or vibration levels perceived during operation of a pulse combustor (or several pulse combustors). In some embodiments, the acoustic resonator(s) is/are tuned to a frequency of an oscillation mode that is to be reduced/eliminated. In some embodiments, the acoustic resonators are tuned by adjusting the size (e.g., chamber volume or height, or tube length) of the resonator. In some embodiments, the resonator is attached at a location corresponding to a pressure anti-node of the oscillation mode that is to be reduced/eliminated.

In some embodiments, the present disclosure relates to systems and methods using pulse combustors operating in-phase. In some embodiments, the present disclosure relates to systems and methods using two or more pulsejets operating in-phase so that they may be collectively operated against another group of pulsejets to produce destructive interference, and, as a result, lower noise and vibration levels. In some embodiments, the first pulse combustor is identical to the second pulse combustor. In some embodiments, each of the first pulse combustor and the second pulse combustor has a fundamental oscillation mode wavelength and one or more additional oscillation modes when operated in isolation. In some embodiments, pulse combustors are connected to one another at their combustion chambers. In some embodiments, the tube connecting the pulse combustion chambers has a length corresponding that is significantly shorter than the fundamental oscillation mode wavelength, e.g., the connecting tube has a length that is equal to or less than $\frac{1}{8}^{th}$ of the fundamental oscillation mode wavelength.

In some embodiments, the present disclosure relates to systems and methods using pulse combustors operating in anti-phase. The anti-phase operation allows for countering the oscillating nature of the first pulse combustor with the oscillating nature of the second pulse combustor (and vice versa), thereby reducing noise and vibration levels as compared to a single pulse combustor operating in isolation or two uncoupled pulse combustors. The pulse combustors operating in anti-phase may be a part of an arrangement of several pulse combustors, where at least two of the pulse combustors operate in anti-phase. In some embodiments, the first pulse combustor is identical to the second pulse combustor. In some embodiments, each of the first pulse combustor and the second pulse combustor has a fundamental oscillation mode wavelength and one or more additional oscillation modes when operated in isolation. In some embodiments, pulse combustors are connected to one another at their combustion chambers. In some embodiments, the tube connecting the pulse combustion chambers has a length corresponding to ½ the fundamental oscillation mode wavelength.

Some embodiments discussed herein relate to reducing or minimizing interference on individual operation of the first and second pulse combustors during anti-phase operation. Some embodiments discussed herein relate to reducing or minimizing oscillation pressure amplitude reductions of the first and second pulse combustors during anti-phase operation. Some embodiments discussed herein relate to reducing or minimizing mechanical power output losses or thrust losses of the first and second pulse combustors during anti-phase operation.

Some embodiments discussed herein relate to determining a location for connecting the pulse combustors to one another to achieve desired system performance during anti-phase operation (e.g., reduced noise, reduced vibration, reduced interference on individual operation of the first and second pulse combustors). Some embodiments discussed herein relate to determining dimensions of a tube (or any other connector type) connecting the first pulse combustor to the second pulse combustor to achieve desired system performance during anti-phase operation.

FIG. 1 is a setup of a typical conventional pulse combustor 100. In FIG. 1, the pulse combustor 100 is comprised of the following: an inlet pipe 104 connected to a combustion chamber 102. The combustion chamber 102 is also connected to an exhaust pipe 106. There is also a fuel injector 108 located in the inlet pipe 104, but other locations and geometries for the fuel injector 108 are also possible. For example, it is also possible to place the fuel injector 108 in the combustion chamber 102. A spark plug 110 is located in the combustion chamber 102 for starting the pulse combustor. The spark plug 110 may be located anywhere in the combustion chamber 102. Any other ignition means (such as, for example, a glow plug) can also be used instead of a spark plug 110.

When fuel and air are introduced into the combustion chamber, a spark produced by the spark plug or other ignition means ignites the fuel-air mixture. The ensuing combustion process causes a rise in the temperature and pressure of the gases inside the combustion chamber. These gases then expand and escape through the inlet and exhaust pipes. The high velocity of the escaping gases causes an overexpansion and negative pressure inside the combustion chamber. This negative pressure then reverses the direction of the flow in the inlet and exhaust pipes. Fresh air drawn in from the atmosphere via the inlet pipe mixes with the fuel (which is injected either in the inlet pipe or directly into the combustion chamber) and enters the combustion chamber where it encounters high-temperature combustion products from the previous combustion event. These combustion products ignite the fresh fuel-air mixture to produce another combustion event and the process repeats indefinitely. It should be noted that there is also flow reversal in the exhaust pipe due to the negative pressure in the combustion chamber, but due to the longer length of the exhaust pipe, the fresh air drawn in from the atmosphere via the exhaust pipe does not reach the combustion chamber before the process restarts. It should also be noted that the spark plug is generally only needed to start operation of the engine, and not to sustain it. Therefore, the spark plug can be turned off once the engine has started.

The net result of the working cycle of a pulse combustor is that the inlet and exhaust ends produce oscillating flows of gas. These oscillating flows are responsible for thrust generation. The exhaust pipe usually generates the highest amount of thrust, but the inlet pipe can also generate a significant amount of thrust. Therefore, in order to make the thrust from the inlet pipe point in the same direction as the thrust from the exhaust pipe, the inlet pipe is often turned to point in the same direction as the exhaust pipe (or vice versa), or is simply attached to the same side of the combustion chamber as the exhaust pipe. Pulsejet engines can be made in a variety of forms. Some have multiple inlets, while others have inlets that are perpendicular to the exhaust pipe. Nevertheless, all these embodiments have the same working principle and are essentially the same device.

Pulsejet engines have often been analyzed using acoustic theories; it has been suggested in scientific and engineering literature that the combination of the combustion chamber and relatively short inlet pipe of a pulse combustor behaves as a Helmholtz resonator, whereas the relatively long exhaust tube of a pulse combustor qualitatively behaves as a quarter-wave tube (or a one-sixth-wave tube, according to some researchers), as discussed, for example, in "A new acoustic model for valveless pulsejets and its application for optimization thrust", F. Zheng et al., *J. Eng. Gas Turbines Power* 130(4), 041501 (Apr. 28, 2008). A pulsejet engine can therefore be modeled as a combination of a Helmholtz resonator and a quarter-wave or one-sixth-wave tube. This model is henceforth referred to as the "Helmholtz model".

It has been suggested in scientific and engineering literature that the operational mode of oscillation of a pulsejet engine is due to the natural oscillation mode of the Helmholtz resonator (combination of combustion chamber and inlet pipe) and the fundamental mode of the quarter-wave or one-sixth-wave tube (exhaust pipe). As a result, the stable frequency of operation of the pulse combustor is related to the fundamental frequencies of the supposed Helmholtz resonator and the quarter-wave or one-sixth-wave tube.

While the Helmholtz model has been used to predict operational frequencies of pulsejet engines with some success, it also predicts that the pressure variations (with time) inside the pulsejet engine, and the corresponding velocity variations (with time) at the open ends (inlet and exhaust ends) of the pulsejet engine should be sinusoidal. However, it has been observed through experimental data that these variations err significantly from sinusoidal, in other words, they display significant amounts of higher frequency variations. If a Fourier transform of the variations is obtained, one would observe harmonics in addition to the fundamental peak. In contrast, if a signal is purely sinusoidal, the Fourier transform will reveal only one peak at the frequency of the sinusoid (the "fundamental"). However, if there is any deviation from sinusoidal behaviour, e.g., multiple sub-peaks in the time domain, the Fourier transform will reveal multiple peaks; the peaks following the fundamental are often termed "harmonics." One skilled in the art would be familiar with Fourier transforms, and the concepts of the fundamental peak and harmonics.

As mentioned earlier, the generally used Helmholtz model predicts sinusoidal pressure and velocity variations (with time), but this behavior has not been observed experimentally. Experimental results have shown numerous peaks and sharper peaks (in the time domain) over the course of a single pulse combustion cycle. It should also be noted that the pressure and velocity variations of the pulse combustor give rise to the acoustic pressure field around the pulse combustor. If these variations were purely sinusoidal, as the Helmholtz model predicts, the noise levels would also not be as high as those observed experimentally because the human ear does not perceive all frequencies evenly. Instead, the human ear tends to be decreasingly sensitive to decreasing frequencies below approximately 1000 Hz (approximated by the decibel A-weighting, familiar to one skilled in the art). FIG. 2B is a graph showing A-Weighting (dB) versus Frequency (Hz) across the frequency range 0 Hz to 4000 Hz, according to some aspects of the present disclosure. The operational frequencies of typical pulse combustors range from approximately 50 Hz to 250 Hz. The human ear is quite insensitive to frequencies of 100 Hz or less, but engines operating at these frequencies have been perceived to be exceptionally loud. The reason for this is that the acoustic signal is not perfectly sinusoidal and the higher harmonics contain a significant amount of energy. The harmonics manifest themselves as higher frequencies which the human ear is more sensitive to, and this is a direct result of the pressure and velocity variations in the pulse combustor not being sinusoidal, as the Helmholtz model would predict.

It is, therefore, useful to provide an explanation for the harmonic content (deviation from sinusoidal behaviour of pressure and velocity fluctuations) in pulsejet engines, and also to provide systems and methods for controlling or eliminating harmonic content in pulsejet engines (e.g., make the pressure and velocity fluctuations more sinusoidal). The control or elimination of harmonic content in pulsejet engines results in the reduction of higher frequencies in the acoustic signal, and that provides reduced noise levels, especially since the human ear is disproportionately sensitive to higher frequencies. The control or elimination of harmonic content can have the same implication for vibration levels, in other words, control or elimination of harmonic content can provide reduced levels of high frequency vibrations. Some embodiments discussed herein relate to designing systems and methods for achieving reduced noise and vibration levels from pulsejet engines.

In some embodiments, the present disclosure utilizes the unsteady and controlled injection of fuel into a pulsejet engine. Such fuel injection has been shown to significantly improve efficiency and/or mechanical energy conversion in a pulsejet engine. Some embodiments discussed herein relate to designing systems and methods for improving efficiency, mechanical energy conversion, and/or thrust from a pulsejet engine (or pulse combustor).

U.S. Pat. No. 7,637,096 B2 proposes pulsing fuel into the pulse combustor in order to improve efficiency and/or mechanical energy output from the pulse combustor, as opposed to continuous fuel injection or fuel injection based on constant supply pressure. A pressure sensor provides information on the pressure cycle/variation within the combustion chamber, and that information is used by a feedback circuit to inject a discrete, steady pulse of fuel at the most advantageous point in the cycle, which was defined as that producing the highest unsteady pressure amplitude within the combustor.

The approach of U.S. Pat. No. 7,637,096 B2 appears to be to pulse fuel into the engine in discrete pulses, and the timing is controlled/determined using a pressure sensor to reduce fuel consumption. Such a technique may produce more efficient operation (as compared to operation without any control of the timing of the pulses) because it will inject fuel when it is needed. However a significant drawback of this technique is that it does not monitor or control where the energy is going—pulsing the fuel in consumes less fuel, but the combustion process is still uncontrolled and includes high-frequency content, leading to excitation of higher oscillation modes inside the engine. In some embodiments discussed herein, the objective is to not only cut off the fuel supply (thereby conserving fuel) when it is not useful, but also to monitor and control into which oscillation mode the energy goes (e.g., channelling the energy into the fundamental oscillation mode). Some embodiments discussed herein relate to exciting only the fundamental oscillation mode during operation.

Furthermore, some embodiments discussed herein relate to minimizing fuel consumption and providing fuel efficiency higher than that of conventional systems (e.g., higher than fuel efficiency of the systems disclosed in U.S. Pat. No. 7,637,096 B2). In some embodiments, high fuel efficiency is achieved because the energy release is controlled and does not excite higher oscillation modes which are inefficient modes for thrust (or mechanical energy) production as they are more susceptible to viscous (frictional) losses (because of their high frequencies). In some embodiments, all the energy that is released is channelled into the fundamental mode, which is the most efficient (lowest-frequency) mode for thrust (or mechanical energy) production.

Figure 2A:
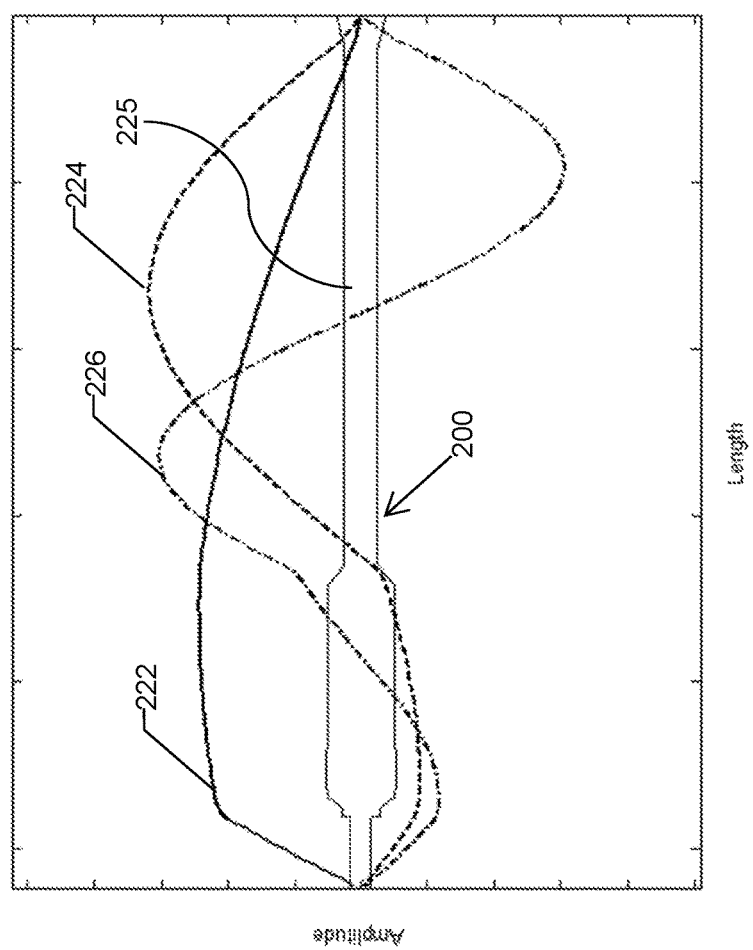
FIG. 2A is a graph showing the first three modes of oscillation for an example pulse combustor, according to some aspects of the present disclosure.
Figure 2B:
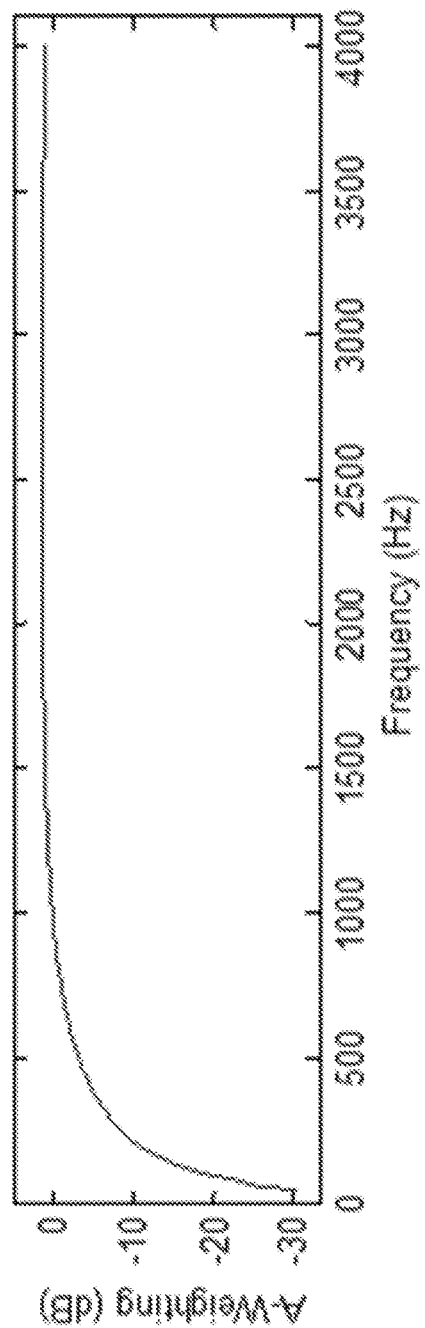
FIG. 2B is a graph showing A-Weighting (dB) versus Frequency (Hz) across the frequency range 0 Hz to 4000 Hz, according to some aspects of the present disclosure.

FIG. 2A is a graph showing the first three calculated modes of oscillation for the gas inside an example pulse combustor 200. In some embodiments, the oscillation modes may be calculated using the methods described in U.S. Provisional Patent Application No. 62/293,533, filed on Feb. 10, 2016, titled "Acoustic Analysis of Valveless Pulsejet Engines" which is incorporated herein by reference in its entirety. In some embodiments, the oscillation modes may be calculated using the methods described in "Vortex-driven acoustically coupled combustion instabilities", T. J. Poinsot et al., *J. Fluid Mech.*, vol. 77, pp. 265-292 (1987), which is incorporated herein by reference in its entirety.

In some embodiments, the oscillation modes may be calculated using the methods described in "Acoustics II: electrical-mechanical-acoustical analogies", Kurt Heutschi, Swiss Federal Institute of Technology Zurich, available from http://www.isiweb.ee.ethz.ch/teaching/courses/ak2/elektro-mechanische-akustische-analogien-english.pdf (Jan. 18, 2013), which is incorporated herein by reference in its entirety and referred to as "Heutschi". One way of calculating the oscillation modes of an acoustic duct is to discretize the duct length-wise into small segments (e.g., as shown in Heutschi, slides 47-49). Then each segment of fluid can be assigned an analogous capacitance (to represent the compliance of the fluid) and an analogous inductance (to represent the inertia of the fluid). In this analogy, fluid pressure is analogous to electrical voltage, and fluid volume flow rate is analogous to electrical current, and the values of the analogous capacitance and inductance are functions of the state of the gas (e.g. density and temperature) and the duct properties (e.g. cross-sectional area and discretization length). The capacitances and inductances of the fluid segments can then be connected to form an analogous circuit for the acoustic duct (bearing strong similarity to an electrical transmission line), and the modal shapes and frequencies of this circuit (duct) can be calculated using widely-available electric circuit solvers (e.g., PSpice) or equivalent modal analysis techniques familiar to one skilled in the art, for example, by casting the differential equations for voltage and current into a matrix, and then calculating the eigenvalues and eigenmodes of the corresponding matrix.

In some embodiments, the oscillation modes may be calculated using the methods described in "Principles of Vibration and Sound", Thomas D. Rossing and Neville H. Fletcher, Springer, 2004. In some embodiments, the oscillation modes may be calculated using the methods described in "Fundamentals of Physical Acoustics", David T. Blackstock, Wiley-Interscience, 2000.

The modes of oscillation may be calculated by treating the pulsejet engine as an acoustic duct with a continuously varying area and/or temperature distribution (along its length), and then calculating its allowable modes of oscillation using known methods. The y-axis represents pressure oscillation amplitude at an axial location. The oscillation mode curves are relevant for their shape, not their absolute amplitudes. In other words, the analysis of the oscillation modes shows how the pressure amplitude varies along the length of the engine, but does not determine the absolute value of this amplitude (which is dependent on other factors). For example, the absolute value of pressure amplitude could change as the engine is throttled (e.g., given more power/fuel), but the pressure distribution could not change, and the distribution is the relevant information for the analysis.

The first mode shape 222 is the unsteady pressure profile inside the pulse combustor for the first calculated mode of vibration. The second mode shape 224 is the unsteady pressure profile inside the pulse combustor for the second calculated mode of vibration. The third mode shape 226 is the unsteady pressure profile inside the pulse combustor for the third calculated mode of vibration. As discussed above, the y-axis amplitude is not intended to indicate the relative strengths of the three modes of oscillation. The relative amplitudes of the mode shapes have no consequence in FIG. 2A, and only the mode shapes (versus length) are relevant. It should also be noted that additional modes of oscillation are also possible, but have not been shown to maintain clarity in FIG. 2A. The geometry of an example pulse combustor 200 is shown to provide a visual reference for the length scale.

Figure 3A:
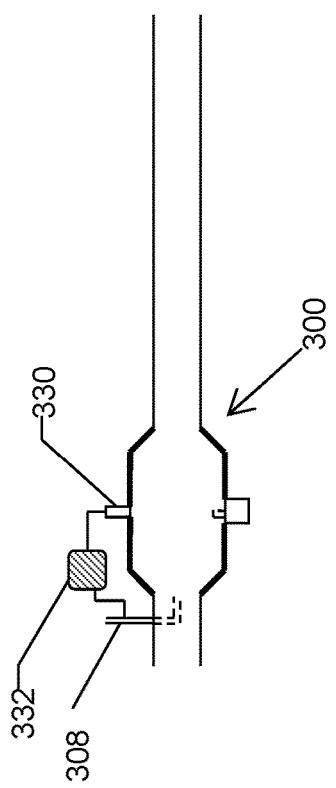
FIG. 3A is a setup of a possible embodiment of the present disclosure using a pressure sensor, according to some aspects of the present disclosure.

FIG. 3A is a setup of another embodiment of a pulse combustor 300, according to some aspects of the present disclosure. The pulse combustor 300 is a pulse combustor of the type shown in FIG. 1. Pressure sensor 330 senses the pressure inside the pulse combustor and is functionally (electronically) connected to an electronic control system 332. The electronic control system 332 is also functionally connected to and controls the fuel injector 308.

In some embodiments, the pressure sensors can detect high-frequency pressure fluctuations (for example, up to about 750 Hz) at amplitudes typically observed in pulsejet engines (for example, up to about 3 atm). In some embodiments, such sensors are of the piezoelectric type, e.g. Kistler 211B6 or 211B5 pressure sensors.

Figure 4:
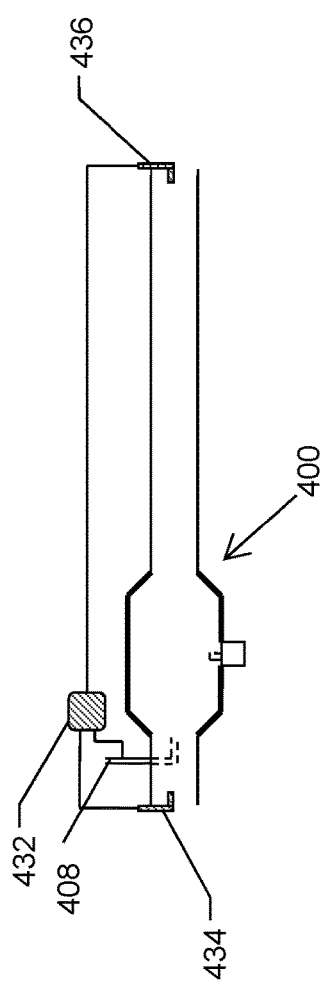
FIG. 4 is a setup of another possible embodiment of the present disclosure using velocity sensors, according to some aspects of the present disclosure.

FIG. 4 is a setup of another embodiment of a pulse combustor 400, according to some aspects of the present disclosure. Pulse combustor 400 is a pulse combustor of the type shown in FIG. 1. Velocity sensor 434 senses the velocity of the fluid at the inlet end of the pulse combustor 400 and is functionally (electronically) connected to an electronic control system 432. Velocity sensor 436 senses the velocity of the fluid at the exhaust end of the pulse combustor 400 and is also functionally (electronically) connected to the electronic control system 432. The electronic control system 432 is also functionally connected to and controls fuel injector 408.

As discussed above, a pulse combustor produces pressure and velocity oscillations in the combustion chamber and the inlet and exhaust pipes. As explained above, pulse combustors have been traditionally analyzed using the Helmholtz model, which predicts sinusoidal pressure and velocity variations (versus time) in the pulse combustor. However, experimental evidence shows that the variations are not sinusoidal.

Another method of analyzing pulse combustors is to assume that they are acoustic ducts. The geometry of a duct filled with compressible fluid (e.g., air) will dictate distinct allowable modes of oscillation of the fluid within (i.e., standing waves). Each mode corresponds to an unsteady pressure and velocity amplitude distribution (in space), along with a frequency of oscillation. FIG. 2A shows the spatial distribution of unsteady pressure amplitude for the first three modes of oscillation for an example pulse combustor 200. One skilled in the art would be familiar with such analysis of acoustic ducts.

It is possible to excite the modes of oscillation shown in FIG. 2A by unsteady heat release within the combustor, which is accomplished by periodic combustion events in a pulse combustor. This phenomenon is mathematically characterized by the well-known Rayleigh criterion. The Rayleigh criterion dictates that different modes of oscillation can be excited depending on the temporal and spatial profiles of the heat release. The heat release process in a pulse combustor is largely uncontrolled (aside of occurring at periodic intervals), and, as a result, the Fourier transform of the heat release in a typical pulse combustor contains significant harmonic content. The harmonic content implies that the energy from heat release is spread over many frequencies, and it is for this reason that multiple modes of oscillation can be (and usually are) excited by a typical combustion process. When these modes of oscillation are excited simultaneously, the net pressure and velocity variations in the pulse combustor are the sum of pressure and velocity variations due to each excited mode of oscillation. While each individual mode of oscillation corresponds to a sinusoidal variation (versus time), the sum of different excited modes of oscillation, with different spatial distributions (as shown, for example, in FIG. 2A) and different frequencies, is not sinusoidal.

Accordingly, pressure and velocity variations in a typical pulse combustor are not sinusoidal. In addition, the acoustic pressure field around the pulse combustor contains significant harmonic content above the fundamental frequency of operation, and, as explained above, it is this harmonic content that bears significant responsibility for high perceived noise levels. Accordingly, some aspects of the present disclosure relate to designing methods and/or apparatus to control, remove, or mitigate harmonic content in the operation of a pulse combustor.

In some embodiments, for example the embodiments shown in FIG. 3A and FIG. 4, the pressure and velocity variations in the pulse combustor are monitored by pressure and/or velocity sensors. Although the pressure and velocity sensors are shown in separate figures, those of ordinary skill in the art would appreciate that, in some embodiments, pulse combustors may be equipped with both pressure and velocity sensors. In some embodiments, if higher modes of oscillation (e.g., modes of oscillation above the fundamental mode) in the pulse combustor have been excited by the combustion process, these higher modes will be detected by the pressure and/or velocity sensors.

In some embodiments, an electronic control system (e.g., 332 and/or 432) utilizes the information received from the pressure and/or velocity sensors to adjust or control the fuel supply to affect the heat release profile to eliminate or minimize the excitation of higher modes of oscillation within the pulse combustor.

In some embodiments, the electronic control system, using information from the pressure and/or velocity sensors, causes the fuel injection system to supply fuel to the pulse combustor in a periodic fashion, but with a profile (fuel flow rate versus time) that eliminates or minimizes (via the heat release profile) the excitation of higher modes of oscillation for a given time-averaged fuel flow rate. In other words, in some embodiments, the electronic control system may use signals received from the pressure and/or velocity sensors to adjust the rate of fuel supply to the pulse combustor.

In some embodiments, the pressure and/or velocity sensors are coupled to the fuel injection system, where the pressure and/or velocity sensors send a signal to the fuel injection system to adjust the profile (fuel flow rate versus time) upon sensing a predetermined event/condition (e.g., upon sensing a pressure and/or velocity that is above a predetermined/pre-set threshold).

In some embodiments, the profile (fuel flow rate versus time) may be adjusted immediately after receiving the signal to adjust the profile. This profile (fuel flow rate versus time) may be hard-coded, i.e. determined a priori and programmed into the electronic control system, or it may be calculated in real-time. The profile is not required to cut the fuel supply at any point in the pulse combustor cycle, nor is it required to provide fuel steadily during any part of the cycle.

In some embodiments, the electronic control system (e.g., 332, 432) produces pressure and/or velocity variations (versus time) within the pulse combustor (e.g., 300, 400) that are as close to sinusoidal as practically possible. As discussed above, if these variations are sinusoidal, the corresponding vibration and acoustic fields will also be (close to) sinusoidal, with minimal harmonic content (minimal energy in high frequencies), resulting in lower noise levels. In turn, this also results in higher efficiency, higher mechanical energy conversion and/or thrust, for at least the following reason: for a given amount of heat energy input (fuel supplied) to the pulse combustor, it is most efficient to have all the energy excite the fundamental (first, lowest frequency) mode, because that mode is least subject to viscous losses. Higher modes with higher frequencies are more susceptible to viscous losses and are therefore less efficient for mechanical energy conversion and/or thrust production. In typical pulse combustors, the heat release profile contains significant harmonic content which excites higher modes of oscillation within the pulse combustor. This means that some of the energy supplied to the pulse combustor has been channeled towards higher modes of oscillation, subject to higher viscous losses as compared with the fundamental mode.

In some embodiments, the heat release is adjusted in such a way that it excites only the fundamental oscillation mode of the duct. This process of how heat can excite sound/pressure waves is described by the Rayleigh criterion, and while the correct heat release to excite just the fundamental would be a sinusoidal heat release (versus time) in the combustion chamber, achieving this sinusoidal heat release is not as simple as just injecting the fuel sinusoidally, because there are many intermediate processes that are practically impossible to have control over (e.g., air-fuel turbulent mixing, droplet evaporation, the combustion chemistry itself). Given the complex pathway between fuel injection and heat release, the fuel injection scheme required to produce the prescribed heat release can be determined empirically. In other words, the engine can be modelled with an input (the fuel injection profile) and an output (the pressure and velocity fluctuations in the engine), and the input (the fuel injection profile) can be varied to achieve the desired output (e.g., single mode excitation). The fuel injection profile to achieve single mode oscillation can be determined using several methods including those pertaining to control theory and optimization principles. In some embodiments, the fuel injection profile to achieve single mode oscillation can be determined using several methods including those pertaining to control theory and optimization principles.

Figure 3B:
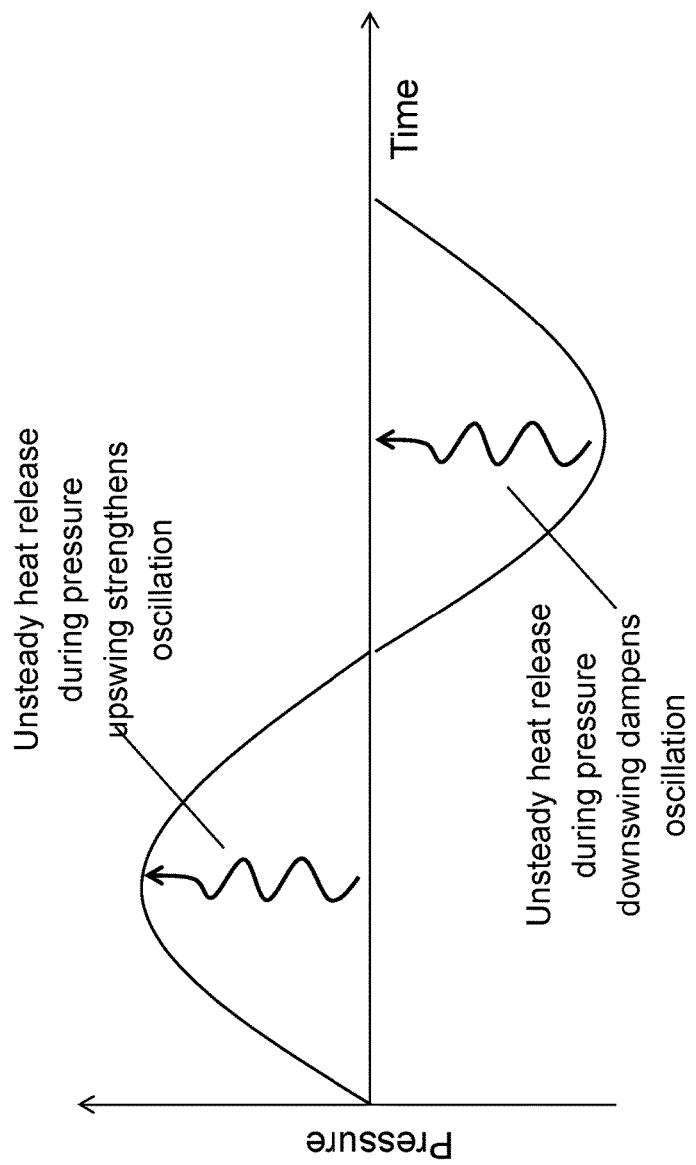
FIG. 3B is a graph showing the effect of the unsteady component of heat release during pressure upswing and downswing, according to some aspects of the present disclosure.

The Rayleigh criterion provides: if there is an acoustic/pressure oscillation at some point, unsteady heat release during the positive (upswing) part of the pressure oscillation will strengthen/reinforce the oscillation, and unsteady heat release during the negative (downswing) part of the pressure oscillation will weaken/dampen the oscillation, as shown in FIG. 3B. Thus, if heat release is periodic, and the positive component of unsteady heat release coincides with the positive parts of any acoustic pressure oscillations, those oscillations will grow and become very powerful (which is what happens in a pulsejet engine).

In some embodiments, the strategy for suppressing undesirable oscillations includes injecting fuel in pulses, but in such a way that unsteady heat release occurs at the negative (downswing) part of the pressure cycle, which suppresses the undesirable oscillation mode.

In some embodiments, undesirable acoustic/pressure oscillation may be suppressed as follows: fuel is injected in pulses at the same frequency as the undesirable mode, but the phase/timing of the injection is empirically varied (with respect to the pressure oscillation, which can be detected via a pressure sensor, e.g., shown in FIG. 3A) until the periodic heat release coincides with the negative part of the pressure cycle and eliminates the undesirable mode.

Figure 3C:
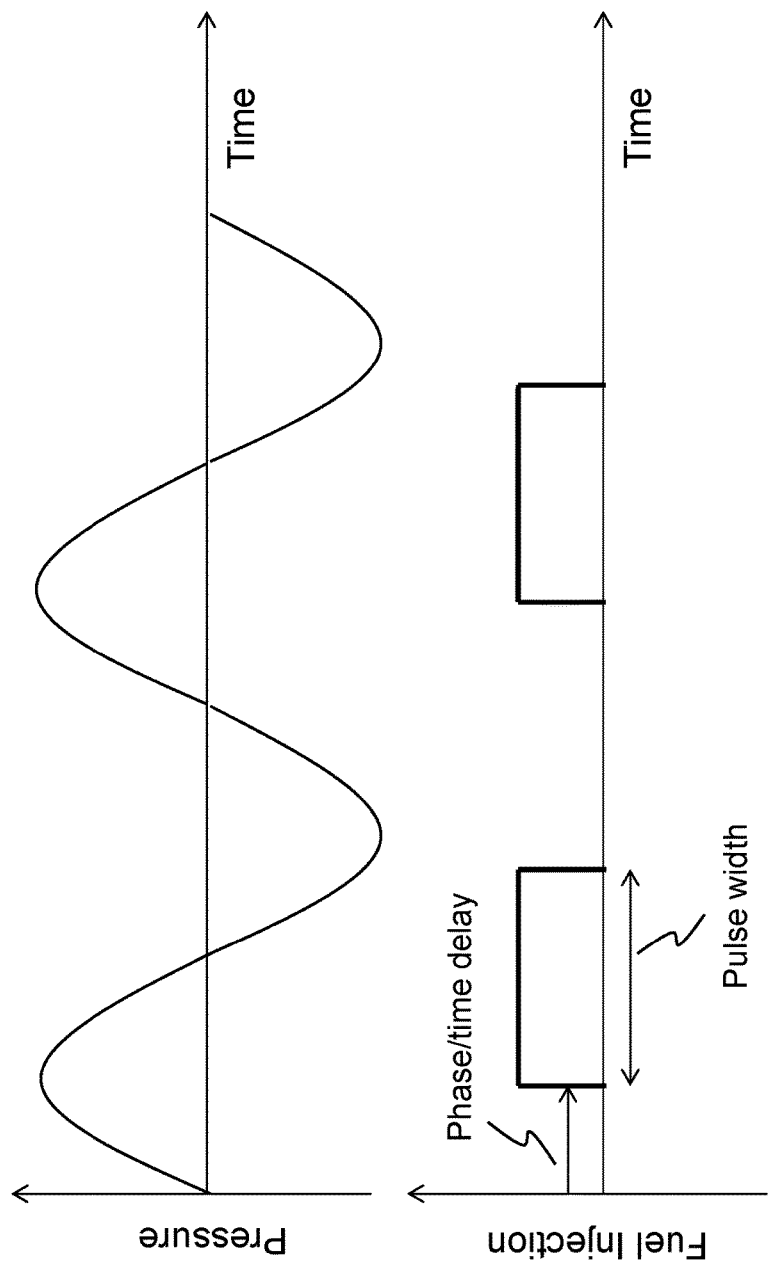
FIG. 3C is a graph of a standard single engine pulse scheme, according to some aspects of the present disclosure.

In some embodiments, undesirable acoustic/pressure oscillation can be suppressed by first pulsing the fuel in a square-wave fashion. The variables that are varied for a square wave can include the pulse-width and the phase-lag of the pulse (as shown, for example, in FIG. 3C). In other words, the timing at which the pulse starts relative to the zero-crossing of the pressure sensor can be varied (the time at which the pressure signal crosses from negative to positive)—this zero-crossing trigger point can be detected, in some embodiments, by a microcontroller or by a dedicated analog circuit. In some embodiments, the precise choice of a reference point is not critical (or not significant), the aim is to sweep the injection point along the cycle to see where it works best, and both these variables (pulse-width and phase/time-lag) can be varied until performance of the combustor is maximized.

Figure 3D:
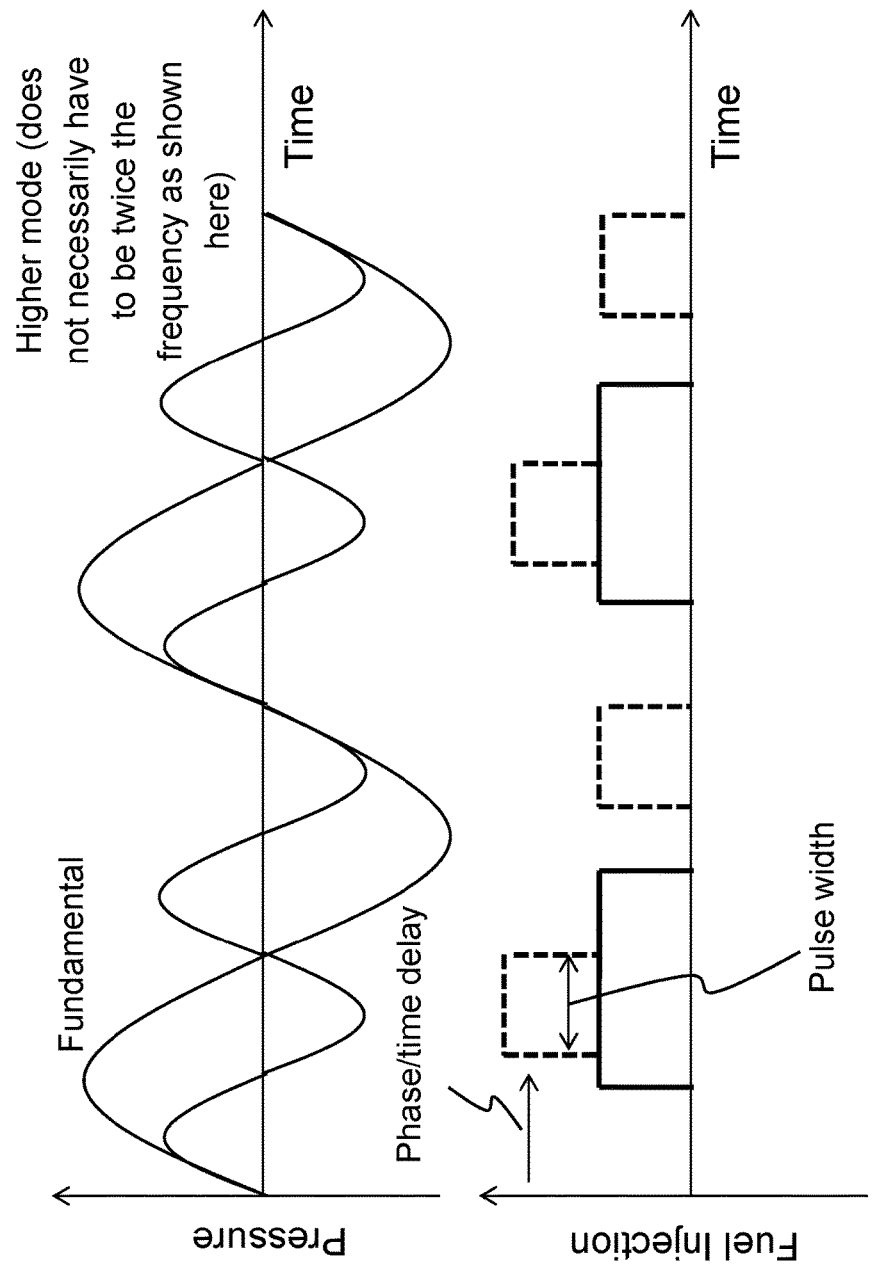
FIG. 3D is a graph of an optimized single engine pulse scheme, where an undesired oscillation mode is suppressed by modifying the pulse injection profile, according to some aspects of the present disclosure.

In some embodiments, a new pulse scheme for the pulsejet engine is designed. In some embodiments, the pressure sensors (e.g., as shown in FIG. 3A) or velocity sensors (e.g., as shown in FIG. 4) are used to determine which other oscillation modes are excited. The fundamental oscillation mode has the lowest frequency. In some embodiments, the mode following the fundamental (e.g., the second oscillation mode) has a higher frequency than the fundamental, and the mode following that mode (e.g., the third oscillation mode) has an even higher frequency. The most powerful oscillation mode aside from the fundamental is usually the oscillation mode that follows directly after the fundamental. In some embodiments, in order to eliminate/suppress the mode of oscillation after the fundamental, fuel can be pulsed at the frequency of the undesirable mode, and the phase-delay and pulse-width can be swept until the desired result is achieved (e.g., until the undesirable mode is eliminated). This fuel pulsing can be superimposed upon the standard square wave that is already driving the fundamental/engine (as shown in FIG. 3D below). In some embodiments, the second, higher-frequency pulses to suppress the undesirable oscillation mode could also be provided using separate fuel injectors—the objective is to create the correct heat release profile inside the engine, which, in some embodiments, could be easier to produce with multiple fuel injectors pulsing at different frequencies to counter different modes.

In some embodiments, a single fuel injector is provided to eliminate/suppress undesirable mode or modes of oscillation. In some embodiments, multiple fuel injectors are provided to eliminate/suppress undesirable mode or modes of oscillation. In some embodiments, the engine includes a first fuel injector and one or more additional fuel injectors, where the number of additional fuel injectors corresponds to the number of modes of oscillation that are eliminated/suppressed. In some embodiments, the engine includes three or more pulse injectors.

In some embodiments, more fuel goes into the engine with the secondary pulse shown in FIG. 3D, but this fuel has been used in a more efficient way than with a single pulse. In other words, in some embodiments, if the same amount of fuel was injected, in one case with a single pulse (e.g., like in U.S. Pat. No. 7,637,096 B2), and in one case with a single-plus-superimposed-double-pulse, the latter case would be more efficient because energy was taken from the inefficient higher mode and channelled into the fundamental (the most efficient mode).

In some embodiments, a new fuel injection profile that excites only the fundamental mode of oscillation can be generated using a control system and available techniques (e.g., the techniques do not need to rely on square-wave method discussed above, other suitable methods may be used). The control system may take in inputs from the pressure and/or velocity sensors, which send signals to the control system indicating which modes are excited, and the control system can adjust the fuel supply at each cycle to ensure that only the fundamental is excited.

In some embodiments, the pressure and/or velocity sensors continuously send signals to the control system. The signals may provide information regarding measured pressure and/or velocity (e.g., pressure and/or velocity values). The controller receives the signal and determined whether the signal indicates an occurrence of a predetermined condition (e.g., if the pressure value is above a predetermined threshold pressure value, and/or if the velocity value is above a predetermined threshold velocity value). In some embodiments, if the controller determines that the measured pressure value is not above a predetermined value, the controller does not make adjustments to the fuel injection profile. In some embodiments, if the controller determines that the measured velocity value is not above a predetermined threshold value, the controller does not make adjustments to the fuel injection profile. In some embodiments, if the controller determines that the pressure and/or velocity value is above a predetermined threshold value, the controller adjusts the fuel injection profile, for example as discussed above (e.g., by superimposing a new pulse profile on an existing pulse injection profile or by adjusting the pulsing profile of a separate fuel injector).

In some embodiments, all the energy supplied to the combustor is channeled into the fundamental mode, resulting in minimal viscous losses, and therefore, a more efficient device as compared with conventional pulse combustors. In some embodiments, the amount of energy supplied to the combustor that is channeled into the fundamental mode is maximized. For example, in some embodiments, over about 90% or over about 95% of energy supplied to the combustor is channeled into the fundamental mode. Some embodiments disclosed herein relate to providing reduced noise (and high-frequency vibration) levels, and to increasing the efficiency of pulse combustors.

In pulse combustors, especially at high throttle (power) levels, sudden or high amounts of heat release can result in large pressure amplitudes. Large amplitude pressure waves can behave differently from low amplitude acoustic pressure waves by 'steepening'. For example, the pressure variations (in time and space) can steepen to exhibit more 'peakiness' or sharper features. The steepening of the pressure profile can also manifest itself as high frequency content (harmonics) in a Fourier transform, corresponding to higher noise levels as explained above. In some embodiments, the electronic control system can tailor the periodic fuel supply profile (versus time) to also minimize the steepening of the pressure profile, and again, minimize harmonic content in the pressure and/or velocity variations (versus time) in the pulse combustor, and therefore in the vibration and acoustic pressure fields around it. The electronic control system (e.g., 332, 432) may receive signals from pressure sensor(s) (e.g., 330) and/or velocity sensors (e.g., 434, 436) described above indicating that the measured pressure and/or velocity values are above predetermined threshold values. The electronic control system (e.g., 332, 432) may send a signal to the fuel injector (e.g., 308, 408) to adjust the fuel supply rate to reduce the pressure and/or velocity to values above the predetermined threshold values.

In some embodiments, the electronic control system (e.g., 332, 432) can utilize information from fluid pressure sensor (s) (e.g., 330) or fluid velocity sensor(s) (e.g., 434), or both to adjust the fuel supply rate in order to minimize harmonic content in the pressure and/or velocity variations in the pulse combustor. FIG. 3A shows an experimental setup in which a pressure sensor 330 supplies information to the electronic control system 332. In some embodiments, if a pressure sensor is used, it should not be placed at a lengthwise location that corresponds to the node of the mode of oscillation that is to be detected, otherwise the pressure sensor will not be able to detect the presence of that mode of oscillation. For example, for the pulse combustor shown in FIG. 2A, a pressure sensor placed near the interface of the combustion chamber and the tailpipe will not be able to detect the presence of the second mode of oscillation 224 because that location is a node of the second mode of oscillation and therefore experiences no pressure oscillations due to that mode. In some embodiments, if a pressure sensor is to be used to detect a mode of oscillation, it should be placed at the pressure anti-node of that mode of oscillation, where it will experience maximum pressure oscillation due to that mode. In practice, however, it can be challenging to find a location that is far from the pressure nodes of all relevant modes of oscillation (usually the first four or five modes of oscillation), and therefore, it can be more practical to use multiple pressure sensors at locations close to anti-nodes of the modes of oscillation of interest.

In some embodiments, pulse combustors with several pressure sensors may be used. In some embodiments, pulse combustors with two or more pressure sensors (e.g., 2, 3, 4, 5, greater than 5 pressure sensors) may be used. In some embodiments, a pressure sensor is located at a distance separated from the pressure nodes of all relevant modes of oscillation (e.g., first 4-5 modes of oscillation) of the pulse combustor. In some embodiments, the pulse combustor includes multiple pressure sensors, wherein a location of each pressure sensor is determined by determining a location of the anti-node of the mode of oscillation that the particular sensor is provided to monitor. In some embodiments, a pressure sensor is provided for each mode of oscillation of interest (e.g., first 4-5 modes of oscillation of the pulse combustor), and each pressure sensor is placed at a location corresponding to an anti-node of the mode of oscillation of interest for which the particular pressure sensor is provided.

In some embodiments, if a velocity sensor is used, that too should be placed at a location that corresponds to the velocity anti-node of the mode of oscillation of interest for maximum sensitivity. In some implementations, velocity anti-nodes are pressure nodes. In some embodiments, suitable locations for placement of velocity sensors include the inlet and/or exhaust end(s) of the pulse combustor (e.g., velocity sensors 434 and 436 for pulse combustor 400 of FIG. 4), because these are pressure nodes and therefore velocity anti-nodes for all permissible modes of oscillation. In some embodiments, it is therefore possible to detect the presence of all modes of oscillation from these two locations using velocity sensor(s). Fluid velocity may be inferred from a dynamic pressure measurement, i.e. using a pressure probe pointed into the flow.

In some embodiments, the pulse combustor includes a velocity sensor at the inlet end. In some embodiments, the pulse combustor includes a velocity sensor at its exhaust end. In some embodiments, the pulse combustor includes a first velocity sensor at its inlet end and a second velocity sensor at its exhaust end.

In some embodiments, a combination of pressure and velocity sensors may be used, the exhaust pipes may be divergent (or flared) to aid in thrust production, and/or the inlet pipes may be u-shaped to point in the same direction as the exhaust pipes (or vice versa).

FIG. 5 is a setup of a pulse combustor 500, according to some aspects of the present disclosure. Pulse combustor 500 is a pulse combustor of the type shown in FIG. 1. A Helmholtz resonator 544 is attached to the pulse combustor 500 and is comprised of a neck 542 attached to a chamber 540. The other end of the neck 542 is attached to the pulse combustor 500, for example as shown in FIG. 5.

Figure 6A:
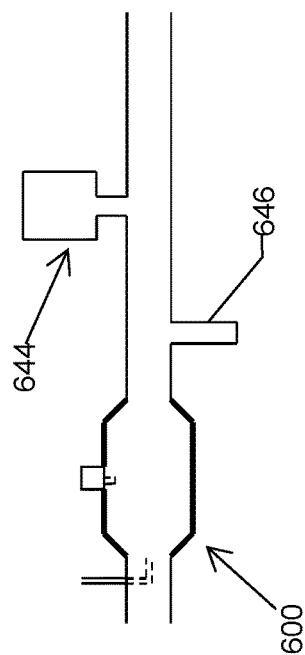
FIG. 6A is a setup of another possible embodiment of the present disclosure, according to some aspects of the present disclosure.

FIG. 6A is a setup of a pulse combustor 600, according to some aspects of the present disclosure. The pulse combustor 600 is a pulse combustor of the type shown in FIG. 1. A Helmholtz resonator 644 is a Helmholtz resonator of the type shown in FIG. 5 and is attached to the pulse combustor 600. A quarter-wave tube 646 is a tube with one closed end and one end attached to the pulse combustor 600.

In some embodiments, the geometry of the pulse combustor can be modified to attenuate or render impossible certain modes of oscillation. In particular, in some embodiments, an acoustic oscillator (such as a Helmholtz resonator or a quarter-wave tube) tuned to a prescribed frequency ('$f_R$') and attached to the pulse combustor dampens oscillations at the prescribed frequency, $f_R$, within the pulse combustor. In some embodiments, the acoustic oscillator is selected to cancel a wave of the prescribed frequency $f_R$. In some embodiments, the dimensions of the oscillator are selected to cancel a wave of the prescribed frequency $f_R$. In some embodiments, the acoustic oscillator is tuned to the same frequency as that of mode of oscillation of the unmodified pulse combustor, and as a result, that mode of oscillation is damped or (theoretically/mathematically) rendered impossible.

Figure 6B:
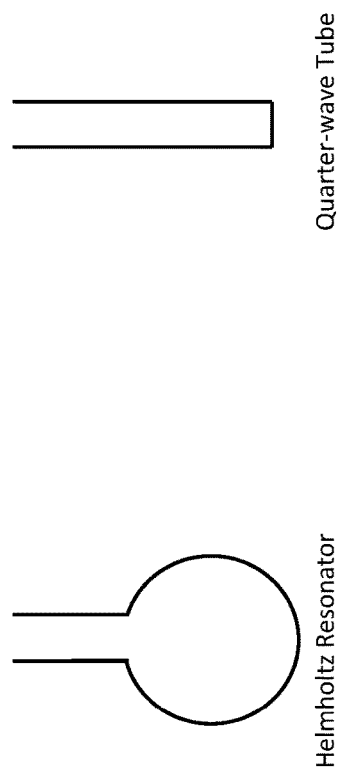
FIG. 6B is an exemplary shape of a Helmholtz resonator (left) and a quarter-wave tube (right), according to some aspects of the present disclosure.

Acoustic resonators generally have resonant frequencies that are functions of their geometry. For example, a Helmholtz resonator is a chamber/cavity with a short neck (e.g., as shown in FIG. 6B), and the resonant frequency of a Helmholtz resonator is $$f = \frac{c}{2\pi}\sqrt{\frac{S}{VL}}$$

where c is the speed of sound, S is the cross-sectional surface area of the neck, V is the volume of the chamber/cavity, and L is the length of the neck. Thus, by adjusting any of these geometrical parameters, the resonant frequency of the Helmholtz resonator can be adjusted; in the present disclosure, this adjustment is referred to as tuning. In other words, the resonant frequency of the resonator is adjusted (by adjusting the geometry) until the resonant frequency equals the frequency of the undesired oscillation mode inside the engine—the Helmholtz resonator then absorbs/damps or mathematically/physically cancels the undesired oscillation mode inside the engine. In some embodiments, the chamber (Helmholtz resonator) is a large cylinder, and the volume is adjusted using a movable piston. In some embodiments, the position of the piston is adjusted (e.g., manually or remotely) to change the frequency and tune the resonator. In some embodiments, this tuning can take place while the engine is running. In some embodiments, the tuning is completed before the engine is running.

In some embodiments, another type of resonator that can operate similarly to a Helmholtz resonator is a quarter-wave tube. A quarter-wave tube is a pipe closed at one end and open at the other, e.g. as shown in FIG. 6B, right. The resonant frequency of a quarter-wave tube is $$f = \frac{c}{4L}$$

where c is the speed of sound and L is the length of the tube. In some embodiments, the frequency f of the quarter-wave tube can be adjusted by changing the length of the tube.

The equations given above for the Helmholtz resonator and the quarter-wave tube resonator are the ideal/theoretical results. In practice, there are some second-order/non-ideal effects (like viscosity) which make the equations not strictly applicable, which is why it is important to be able to make some empirical adjustments to the resonators during the development process. The equations give above provide an idea of the approximate dimensions of the required resonators, but fine tuning can be done empirically.

A pulse combustor 500 with a Helmholtz resonator 544 is shown in FIG. 5. As explained above, an unmodified pulse combustor admits the possibility of several modes of oscillation. In some embodiments, a Helmholtz resonator is tuned to a prescribed frequency ('$f_R$') and is attached to the tailpipe of the pulse combustor. In some embodiments, a Helmholtz resonator tuned to a prescribed frequency ($f_R$) will dampen any modes of oscillation at the prescribed frequency $f_R$. Therefore, in some embodiments, $f_R$ is set to the same frequency as the frequency of the mode of oscillation that is to be damped or (mathematically) eliminated. The mode of oscillation to be damped or eliminated is usually not the first mode (the 'fundamental' mode) since that is important for the operation of the pulse combustor. Accordingly, the acoustic resonator (e.g., Helmholtz resonator 544 in FIG. 5) can be tuned to counter a higher mode of oscillation, for example, tuned to counter the second or third mode of oscillation, since these modes usually contain the most energy after the fundamental mode and have the largest impact on undesired deviations from sinusoidal behaviour in the pressure and velocity fluctuations (versus time) in pulse combustors. It should be noted that while FIG. 5 shows a Helmholtz resonator attached to the pulse combustor 500, in some embodiments, any other type of acoustic resonator, such as a quarter-wave tube, can also be used to produce a similar result based on the same physical principles as for a Helmholtz resonator. Therefore, the present disclosure includes all acoustic resonators that can be used to dampen or eliminate specified oscillations of a fluid inside a pulse combustor.

With regard to the placement of the acoustic resonator along the length of the pulse combustor, mathematically or theoretically, it is of little consequence. In some embodiments, the location of placement of the acoustic resonator is significant. In some embodiments, for maximum effect (damping), the acoustic resonator should be placed at or near the pressure anti-node of the mode of oscillation that is to be damped, because maximum pressure amplitude is expected at the pressure anti-node, resulting in maximum interaction (and therefore, cancellation) with the acoustic resonator. In some embodiments, placing the acoustic resonator at or near the pressure node of the mode of oscillation that is to be damped will result in minimal damping of that particular mode of oscillation, because there will be minimal pressure fluctuations at that location to interact with the acoustic resonator as described in relation to the placement of the pressure sensors above. As such, in some embodiments, the acoustic resonator should not be placed at a lengthwise location that corresponds to the node of the mode of oscillation that is to be damped.

In some embodiments, the ideal location for placement of an acoustic resonator can be determined by looking at the mode shapes (e.g., in FIG. 2A). In some embodiments, the ideal location is the pressure anti-node, where maximum pressure oscillation takes place. For example, if the goal is to eliminate the second mode 224 in FIG. 2A, a resonator should be placed at the mid-point 225 of the exhaust/tailpipe where the pressure amplitude can be seen to be a maximum.

In some embodiments, selection of a particular type of acoustic resonator for damping or (mathematically) eliminating modes of oscillation is important. An acoustic resonator with a broad frequency response can interact with and damp modes of oscillation other than the intended mode of oscillation due to its high bandwidth. This can be undesirable, especially if the acoustic resonator interacts with and damps the fundamental (the first mode of oscillation) since this will negatively affect the operation of the pulse combustor. However, utilizing an acoustic resonator with a large bandwidth may also be advantageous in some embodiments because it may allow two or more undesirable modes of oscillation to be damped with the application of a single acoustic resonator. Whether a large bandwidth is beneficial or detrimental is dependent on particular circumstances and pulsejet engine setup. In some embodiments, particularly where narrow bandwidths are desired/required, for example to avoid interactions with modes of oscillation other than the mode of oscillation intended to be damped, quarter-wave tubes can be employed as acoustic resonators, since they can have relatively narrow bandwidths.

In some embodiments, two or more modes of oscillation in a pulse combustor can require damping before the desired pressure and velocity fluctuations are obtained. In some embodiments where multiple modes of oscillation are to be damped or (mathematically) eliminated in a pulse combustor, it is possible to attach multiple acoustic resonators along the length of a pulse combustor. Each acoustic resonator may be tuned to the respective frequency of the mode of oscillation that is to be damped, and placed (ideally) at the respective pressure anti-node of the mode of oscillation that is to be damped, as shown, for example, in FIG. 6A. Different types of acoustic resonators can be used in such applications, depending on the desired frequency responses, as shown in FIG. 6A, in which both a Helmholtz resonator and a quarter-wave tube are employed simultaneously.

In conventional pulsejet engine operation, several modes of oscillation may be excited, as discussed above. The fundamental ($1^{st}$ mode) is always excited (that is the basic operation of the pulsejet engine), but in addition, multiple other unwanted modes may also be excited (e.g., the $2^{nd}$ and $3^{rd}$ modes of oscillation following the fundamental), and it could be necessary to use different resonators to counter/eliminate different unwanted modes. In some embodiments, if the $2^{nd}$ and $3^{rd}$ oscillation modes are excited, in order to counter/eliminate them, two different resonators tuned to the respective frequencies of the $2^{nd}$ and $3^{rd}$ modes could be used and placed at their respective anti-nodes, as discussed above. In some embodiments, the $2^{nd}$ oscillation mode is the most troublesome and powerful of the unwanted modes.

In some embodiments, an acoustic resonator with a broad bandwidth range may be used to dampen or eliminate undesired mode(s) of oscillation. In some embodiments, an acoustic resonator with a narrow bandwidth range (e.g., quarter-wave tube) may be used to dampen or eliminate undesired mode(s) of oscillation. In some embodiments, one or more acoustic resonator(s) may be selected to dampen or eliminate a particular undesired mode of oscillation or a range of undesired modes of oscillation.

FIGS. 7A-E show plots of microphone signals for pulse combustors with attached resonators of different volumes, according to some aspects of the present disclosure. FIG. 7A is a plot of microphone signal for a pulse combustor with no resonator attached, i.e., an unmodified pulse combustor.

Figure 7F:
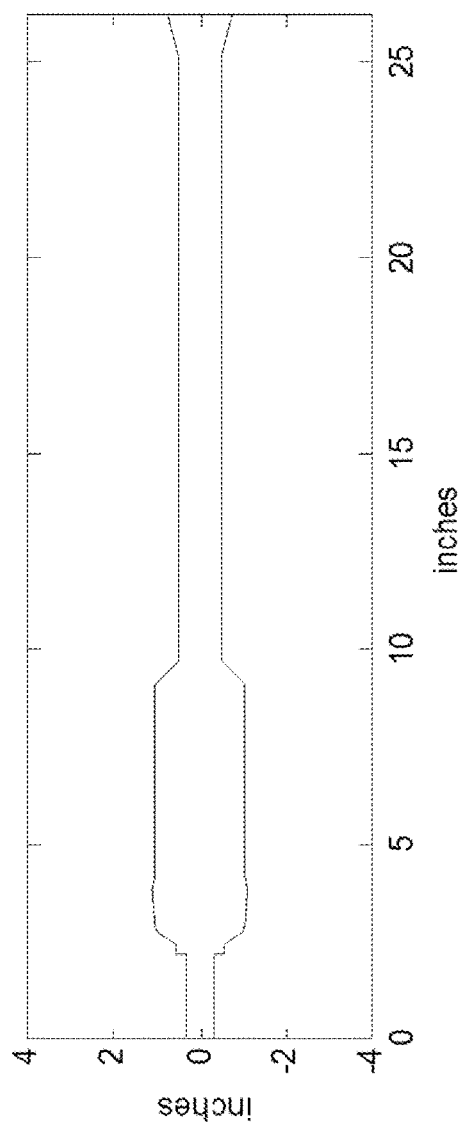
FIG. 7F is an example pulse combustor to which a resonator may be attached, according to some aspects of the present disclosure.

FIG. 7F is an example combustion engine to which an acoustic resonator may be attached. In some embodiments, an acoustic resonator is attached at the mid-point of the exhaust/tailpipe. In some embodiments, the acoustic resonator is attached at a location that corresponds to about 18 inches in FIG. 7F, which is where the pressure anti-node of the $2^{nd}$ mode is approximately located, as seen in FIG. 2A.

As seen in the plot in FIG. 7A, the plot has multiple peaks over a course of a single firing cycle; the signal is very uneven and jagged, which produced most of the perceived noise. FIG. 7B is a plot of microphone signal for a pulse combustor with a resonator having a volume of 3.5 $in^3$ and a height of 1 inch. The plot in FIG. 7B shows less roughness than the plot in FIG. 7A, indicating that the presence of the acoustic resonator resulted in dampening/cancellation of at least some undesired oscillation mode(s). FIG. 7C is a plot of microphone signal for a pulse combustor with a resonator having a volume of 6.9 $in^3$ and a height of 2 inches. The plot in FIG. 7C has a more regular (more sinusoidal) shape and less roughness than the plots in FIGS. 7A-B, indicating that the presence of the acoustic resonator resulted in dampening/cancellation of at least some undesired oscillation mode(s). FIG. 7D is a plot of microphone signal for a pulse combustor with a resonator having a volume of 10.4 $in^3$ and a height of 3 inches. The plot in FIG. 7D has a more regular (more sinusoidal) shape and less roughness than the plots in FIGS. 7A-C, indicating that the presence of the acoustic resonator resulted in further dampening/cancellation of at least some undesired oscillation mode(s). FIG. 7E is a plot of microphone signal for a pulse combustor with a resonator having a volume of 12.1 $in^3$ and a height of 3.5 inches. The plot in FIG. 7E has a more regular (more sinusoidal) shape and less roughness than the plots in FIGS. 7A-D, indicating that the presence of the acoustic resonator resulted in dampening/cancellation of at least some undesired oscillation mode(s).

As shown in FIGS. 7A-E, tuning a resonator to dampen or eliminate undesired mode or modes of oscillation may be accomplished by changing the volume/height of the resonator. The plots in FIGS. 7C-E have microphone signals with shapes that are more sinusoidal than the plots in FIGS. 7A-B.

FIGS. 7A-E show microphone signals from a single engine. The plots in FIGS. 7C-E are of the shape/form that would cancel if they were anti-phased with a signal that is identical or similar to themselves, i.e. if these signals were shifted in phase half a cycle and superimposed upon the original signal, the resulting amplitude would be significantly less because of destructive cancellation (the 180° phase-shifted signal is, in practice, provided by another engine running in anti-phase). This is demonstrated in FIGS. 14A-C below. The plots at the top (FIGS. 7A-B) are quite irregular and jagged, and those signals, if anti-phased with identical or similar signals as themselves, would not cancel.

The plots in FIGS. 7D-E achieved a reduction in noise of about 7-8 dBA. A noise reduction of 10 dBA is generally accepted to be subjectively half as loud. The specifics of the resonator dimensions, sounds pressure level, and noise reduction for the examples in FIGS. 7A-E are shown below in Table 1:

TABLE 1

Configuration for Results in FIGS. 7A-7E

|  | FIG. | | | | |
| --- | --- | --- | --- | --- | --- |
|  | 7A | 7B | 7C | 7D | 7E |
| Chamber Height (inches) | 0 | 1 | 2 | 3 | 3.5 |
| Chamber Volume (inches$^3$) | 0 | 3.5 | 6.9 | 10.4 | 12.1 |
| Sound Pressure Level (dBA) | 113.5 | 112 | 108.5 | 106.5 | 105 |
| Noise Reduction (dBA) | 0 | −1.5 | −5 | −7 | −8.5 |

It has been proposed that destructive interference between the force and acoustic pressure waves/signals from multiple pulsejet engines can lead to reduced vibration and noise levels, respectively, as compared with a single engine operating in isolation. In some embodiments, one way of creating such destructive interference is to manipulate/control the phases of the pulsejet engines with respect to one other. In some embodiments, pairs of pulsejets operate in anti-phase, or, in other words, 180° out-of-phase, so that when one engine is exhausting, the other engine is ingesting air, leading to the destructive interference of force or acoustic pressure waves/signals.

In some embodiments, two engines are arrayed and the engines operate out-of-phase.

In some embodiments, more than two engines are arrayed (such as for the aforementioned VTOL application, e.g., as discussed in U.S. Pat. No. 6,793,174 B2); in such implementations, some engines may operate in-phase and some engines may operate out-of-phase. For example, in an array with multiple engines between which destructive interference is needed, half the engines (engine group A) could be locked in-phase with respect to the engines in group A. The remaining half of the engine array (engine group B) could also be locked in-phase with respect to the engines in engine group B, but the phase of engine group B can be shifted 180° with respect to the phase of engine group A, in other words, engine group A and engine group B operate in anti-phase, to produce destructive interference of force and acoustic pressure waves/signals.

It is, therefore, useful to devise novel systems and methods for forcing two or more pulse combustors (or pulsejet engines) to operate in-phase with minimal interference in the operation of the individual pulse combustors (or pulsejet engines).

Figure 8:
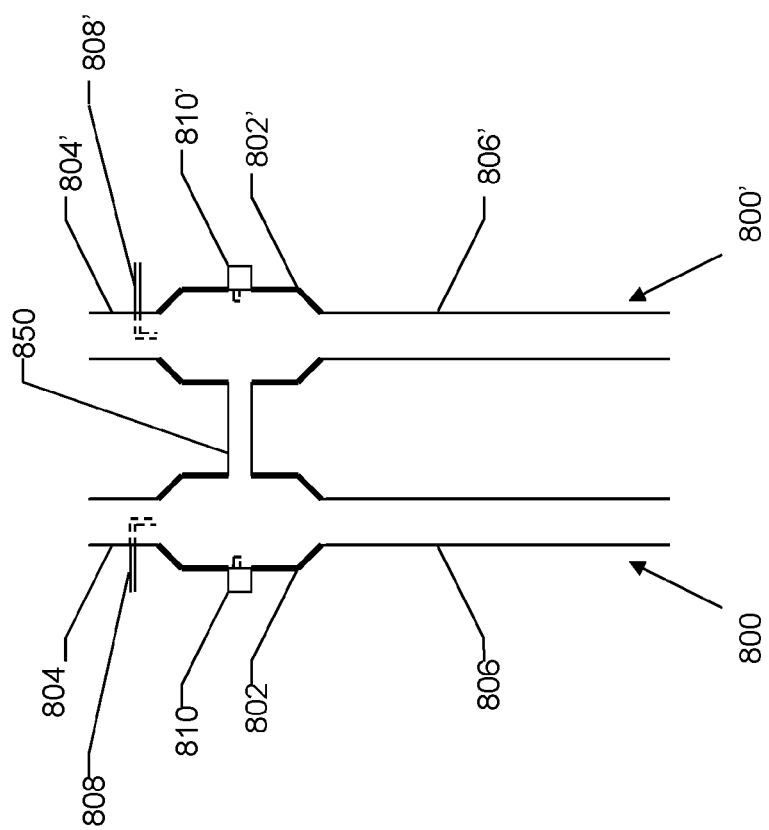
FIG. 8 is a setup of an experimental setup including two pulse combustors 800 and 800' operating in-phase, according to some aspects of the present disclosure.

FIG. 8 shows an experimental setup including two pulse combustors 800 and 800' operating in-phase, according to some aspects of the present disclosure. In FIG. 8, pulse combustor 800 includes the following: an inlet pipe 804 connected to a combustion chamber 802. The combustion chamber 802 is also connected to an exhaust pipe 806. The pulse combustor 800 may also include a fuel injector 808 located in the inlet pipe 804, but other locations and geometries for the fuel injector 808 are also possible. For example, it is also possible to place the fuel injector 808 in the combustion chamber 802. A spark plug 810 is located in the combustion chamber 802 for starting the engine. Any other ignition means (such as a glow plug) can also be used instead of a spark plug.

In FIG. 8, pulse combustor 800' includes the following: an inlet pipe 804' connected to a combustion chamber 802'. The combustion chamber 802' is also connected to an exhaust pipe 806'. The pulse combustor 800' may also include a fuel injector 808' located in the inlet pipe 804', but other locations and geometries for the fuel injector 808' are also possible. For example, it is also possible to place the fuel injector 808' in the combustion chamber 802'. A spark plug 810' is located in the combustion chamber 802' for starting the engine. Any other ignition means (such as a glow plug) can also be used instead of a spark plug. Pulse combustor 800' may have the same physical dimensions as pulse combustor 800. Connecting tube 850 connects combustion chamber 802 with combustion chamber 802'. Connecting tube 850 is in fluid connection with combustion chamber 802 and combustion chamber 802'. The connecting tube 850 in FIG. 8 is shown as being straight geometry, but the exact shape of connecting tube 850 is not critical to the operation of the pulse combustors 800 and 800'. For example, in some embodiments, the connecting tube 850 may have a bent or curved configuration.

Figure 9:
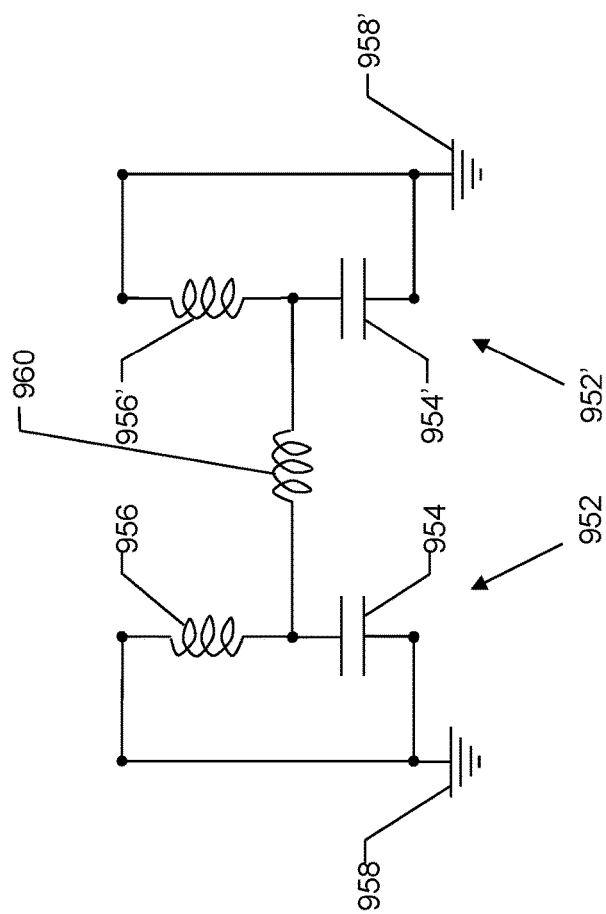
FIG. 9 is an analogous electric circuit to explain the working of certain embodiments of the invention, according to some aspects of the present disclosure.

FIG. 9 is an electric circuit, according to some aspects of the present disclosure, that can be used to analyze or simulate behaviour of pulse combustors that will be discussed below. In FIG. 9, Helmholtz resonator 952 is comprised of a capacitor 954, inductor 956, and ground 958. One terminal of the capacitor 954 is connected to the ground 958, while the other terminal of the capacitor 954 is connected to the inductor 956 and inductor 960. The inductor 956 is connected to the capacitor 954 and the inductor 960 at one end, while the other end is connected to the ground 958.

Helmholtz resonator 952' is comprised of a capacitor 954', inductor 956', and ground 958'. One terminal of the capacitor 954' is connected to the ground 958', while the other terminal of the capacitor 954' is connected to the inductor 956' and the inductor 960. The inductor 956' is connected to the capacitor 954' and the inductor 960 at one end, while the other end is connected to the ground 958'. The ground 958 and the ground 958' may be at the same reference voltage level.

In some embodiments, if two pulsejets are connected at their combustion chambers by a short duct, they will operate in-phase. In some embodiments, a short duct refers to $l < \lambda/8$, in other words, the connecting duct length is less than one-eighth of the wavelength, where the wavelength is the wavelength of the fundamental operating mode, which can be defined as $\lambda = c/f$ (where c is the speed of sound and f is the frequency at which the engine is operating).

Figure 10:
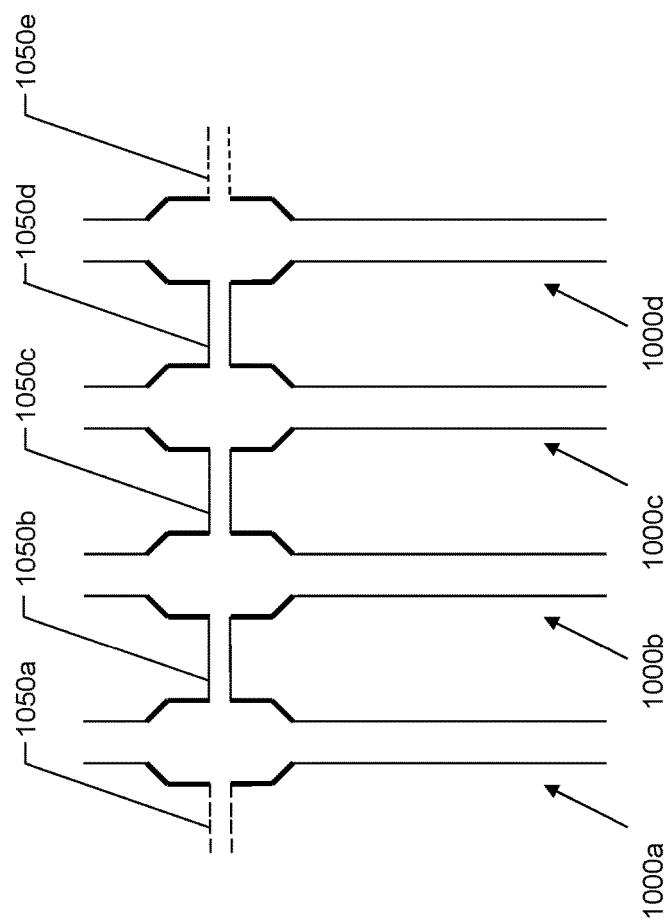
FIG. 10 is a setup of an array of connected pulse combustors 1000a, 1000b, 1000c, and 1000d, according to some aspects of the present disclosure.

FIG. 10 shows an array of connected pulse combustors 1000a, 1000b, 1000c, and 1000d, according to some aspects of the present disclosure. The combustion chamber of pulse combustor 1000b is in fluid connection with the combustion chamber of pulse combustor 1000a and with the combustion chamber of pulse combustor 1000c by means of connecting tube 1050b and connecting tube 1050c, respectively. The combustion chamber of pulse combustor 1000c is in fluid connection with the combustion chamber of pulse combustor 1000*b* and the combustion chamber of pulse combustor 1000*d* by means of connecting tube 1050*c* and connecting tube 1050*d*, respectively. Connecting tube 1050*a* and connecting tube 1050*e* are in fluid connection with pulse combustor 1000*a* and pulse combustor 1000*d* respectively, and are shown dotted to indicate that they may be connected to other pulse combustors in a continuing array, or may be terminated (closed) in the event that the array does not contain any further adjacent pulse combustors. FIG. 10 shows four pulse combustors for illustration purposes, but the scope of the present disclosure includes any number of pulse combustors, provided there are two or more. For example, in some embodiments, 2-10 pulse combustors may be used, or more than 10 pulse combustors may be used.

A pulse combustor produces pressure oscillations in the combustion chamber and flow oscillations in the inlet and exhaust pipes, as discussed above. The frequency of these oscillations is denoted as 'f', which refers to the number of combustion events per second inside the engine, i.e., the operating frequency of the engine, which is equal to (or close to) the frequency of the fundamental (1$^{st}$) mode as that is the main driving force in the engine. In most engines, the frequency of the fundamental is between about 50-250 Hz. The average speed of sound inside the pulse combustor is denoted as 'c'. The corresponding wavelength, denoted as 'λ', can be calculated using the formula, λ=c/f.

The length of the connecting tube, e.g., connecting tube 850 in FIG. 8 is denoted as 'l', and this length may be significantly shorter than the wavelength, λ. In mathematical notation, l<<λ. In some embodiments, l<λ/8, or less than 12.5% of λ.

As discussed above, a pulse combustor can be modeled as a combination of a Helmholtz resonator and a quarter-wave or one-sixth-wave tube. An isolated, single pulse combustor will generally have a stable mode of oscillation. A pulsejet can have many different modes with their corresponding frequencies and wavelengths, but the main driving force behind the engine, and the one that carries the most energy, is the fundamental (1$^{st}$) mode. The other modes (2$^{nd}$, 3$^{rd}$, etc.) that get excited contain less energy than the fundamental and can be seen as nuisances superimposed on top of the fundamental. Accordingly, for the purposes of discussing the basic operation of the engine and its behaviour relative to other engines (e.g., in-phase, anti-phase), the most relevant mode is the fundamental, accordingly, the frequency and wavelength of the stable mode as discussed herein refers to that of the fundamental. Practically, the frequency (f) for an engine is the number of combustion events per second—this frequency is approximately the frequency of the fundamental mode, and can be easily measured. The corresponding wavelength is λ=c/f (c is the speed of sound).

This stable mode of oscillation is due to the natural oscillation mode of the Helmholtz resonator (combination of combustion chamber and inlet pipe) and the fundamental mode of the quarter-wave or one-sixth-wave tube (exhaust pipe). As a result, the stable frequency of operation of the pulse combustor is related to the fundamental frequencies of the supposed Helmholtz resonator and the quarter-wave or one-sixth-wave tube. Therefore, the wavelength of operation of a pulse combustor, λ, can sometimes be approximated as the wavelength of operation of a Helmholtz resonator which is comprised of the combustion chamber and the inlet pipe of the pulse combustor, which is discussed, for example, in "A new acoustic model for valveless pulsejets and its application for optimization thrust", F. Zheng et al., *J. Eng. Gas Turbines Power* 130(4), 041501 (Apr. 28, 2008). One skilled in the art would know how to calculate this wavelength. As discussed above, the frequency of a Helmholtz resonator is $$= \frac{c}{2\pi}\sqrt{\frac{S}{VL}},$$

and the corresponding wavelength can be calculated as λ=c/f. This wavelength (of the supposed Helmholtz resonator) can be used to approximate the maximum allowed length of the connecting tube.

If two pulse combustors are connected to each other at their combustion chambers via a connecting tube, there is more than one possible mode of oscillation. If gas is allowed to move through the connecting tube, it can result in an oscillation mode which has a higher frequency. This is because the connecting tube can provide an additional avenue for gases to escape and enter the combustion chambers. This in turn can result in faster emptying and filling of the combustion chambers, which corresponds to a higher frequency of operation.

Figure 11A:
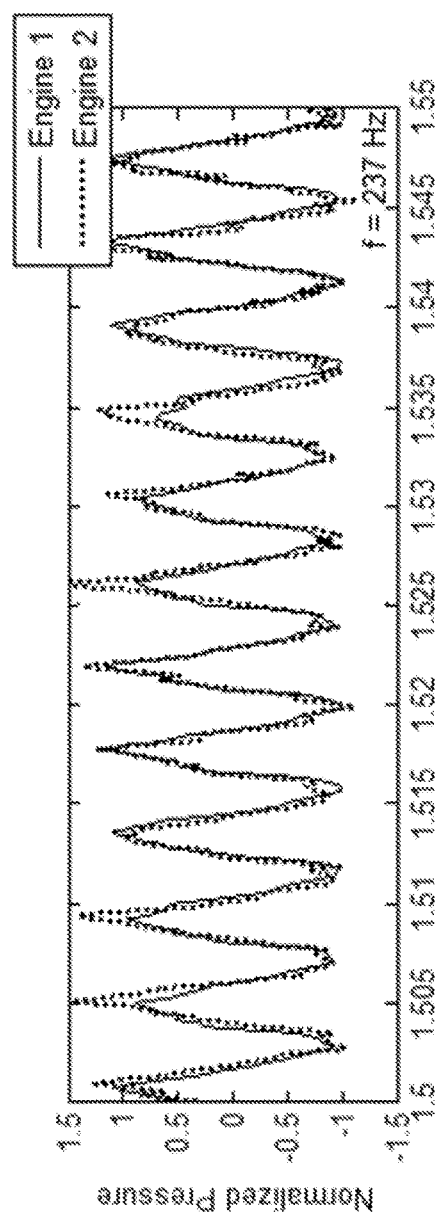
FIG. 11A is a plot of normalized pressure versus time from an experimental engine chamber with two engines operating in phase, according to some aspects of the present disclosure.

In some embodiments, the length of the connecting tube (e.g., connecting tube 850 in FIG. 8) is much less than the wavelength, λ (e.g., less than about 12.5% of λ), and the connecting tube will not admit any gas from, nor expel any gas into, the combustion chambers if the pulse combustors operate at their natural, uncoupled operating frequencies, but in-phase. This is the stable operating mode of the coupled system of two or more pulse combustors (e.g., as shown in FIG. 8), as has been experimentally verified, for example as shown in FIG. 11A.

One way to explain the aforementioned phenomenon is to consider the parts of the pulse combustors that can be approximated as Helmholtz resonators, i.e. the combustion chambers and the inlet pipes. Helmholtz resonators are often analyzed as analogues of electrical components; specifically, the chambers are analogous to capacitors and the inlet pipes are analogous to inductors. Furthermore, the fluid pressure is analogous to voltage and the volume velocity of the fluid is analogous to electric current. Using this analogy, Helmholtz resonators can be analyzed as electrical circuits, comprising of a capacitor and an inductor in series, as shown, for example, in FIG. 9. One skilled in the art would know how to calculate the frequency and mode shape, i.e. form of solution, of such a circuit. An example method for calculating the modes/frequencies for such systems is discussed, for example, in "Introduction to Vibrations and Waves" by H. John Pain and Patricia Rankin (John Wiley & Sons, Ltd.). The connecting tube 850 in FIG. 8 is short compared to the wavelength, k, as discussed above, and for this reason, it is analogous to an inductor 960 in FIG. 9.

A single, isolated Helmholtz resonator, such as Helmholtz resonator 952 or Helmholtz resonator 952' shown in FIG. 9, has a fundamental mode of oscillation in which the (combustion) chamber pressure (or in analogous terms, voltage across capacitor) varies sinusoidally at a calculable constant frequency. If two Helmholtz resonators are connected at their chambers via a short tube, as shown, for example, in FIG. 8 (and analogously, FIG. 9), the fundamental mode of oscillation dictates that both (combustion) chamber pressures vary sinusoidally and in-phase. This can be verified using analytical or numerical methods by one skilled in the art. Other modes of operation, in which gas is transmitted across connecting tube 850, correspond to higher frequencies, and are, therefore, not preferred by the system (because they are modes of operation which do not conform to the natural mode of operation of a single, isolated pulsejet engine). The preceding electric-acoustic analogous explanation does not account for the exhaust pipes (there are no simple electrical analogues for exhaust pipes), but a more detailed electric circuit that also models the exhaust pipes will produce the same or analogous result, in other words, the fundamental mode generally requires both pulse combustors (or both analogous circuits) to operate in-phase. It has been experimentally verified that analysis using just Helmholtz resonators is sufficient to explain and predict phase relationships between pulse combustors.

While in an ideal case, no gas would be exchanged between the combustion chambers (e.g., combustion chambers 802 and 802' in FIG. 8) through the connecting tube (e.g., connecting tube 850 in FIG. 8) in the preferred (stable) mode of operation, non-ideal effects, such as viscosity, may cause deviations from this ideal behavior. However, even when there are deviations from the ideal behavior, a tube with length much less than $\lambda$ connecting the combustion chambers of two pulse combustors (e.g., as shown in FIG. 8) can cause the pulse combustors to operate in in-phase, because this mode of operation minimizes the exchange of gas between the combustion chambers via the connecting tube.

In a standard pulsejet, the fuel is supplied at a constant rate/pressure. The pulsating nature of the device is due to the acoustic fluctuations in the device. Combustion needs fuel and air, and while the fuel is supplied constantly (or at constant pressure), the air is only ingested periodically during the intake portion of the pressure/acoustic cycle, and so the fuel-air combination only arises periodically, leading to periodic combustion, which energizes the standing wave/mode in the engine. Fuel can be pulsed into the engine, but that is generally only used to improve fuel economy, rather than for affecting the pulsating operating of the engine. As such, the pulsating nature of the engine is due to the acoustic wave/mode properties of the engine.

A single pulsejet engine has its characteristic operating (fundamental) mode with its corresponding frequency and pressure distribution, and the fuel injection system is built to energize this mode, i.e. the basic operation of the engine. If two such engines are connected together with a short duct, they could operate in a number of ways. If the engines operated in anti-phase (with a short duct connection), then when engine 1 is at the positive pressure part of its cycle, engine 2 will be at its negative pressure part of its cycle, and air will have to flow from the engine 1 to engine 2. This additional flow of air into and out of the engine fundamentally alters the oscillation mode, frequency, and pressure distribution that the single engine operated at, and that the original fuel injection system was designed to energize—which is why this mode of operation (anti-phase) will not be the preferred mode of operation of this engine. In fact, any mode of operation other than the one the engine was originally designed to operate in will not be a preferred mode of operation of that engine. In some embodiments, when two engines are connected by a short duct, the only way operation in the original mode can be guaranteed is that there is no air flow through the connecting duct, and this is only possible if the engines lock in-phase. When the engines operate in-phase, both engines 1 and 2 have their positive and negative pressure cycles at the same time. There is no pressure difference across the two engines at any time, and therefore, no air will flow into or out of either engine through the connecting duct, which allows the engines to operate as if they were operating in isolation, i.e. at the same mode. This is why two engines connected by a short duct will prefer to naturally lock in-phase—because both engines operate in the mode at which the engines were designed to operate in.

Accordingly, in some embodiments, in order to achieve two engines operating in phase, the goal is to connect the two engines in such a way that the connection effectively acts as a closed end in the operating mode that is desired. Thus, if in-phase operation is desired, the connecting duct should be effectively a closed end when the engines operate in-phase, not allowing any gas flow. In some embodiments, the connecting tube will cause in-phase operation of the engines regardless of how the fuel is injected (e.g., constant or pulsed).

In some embodiments, the connecting tube (e.g., connecting tube 850 in FIG. 8) may have a diameter of approximately one-half of that of the inlet pipe 804 (or inlet pipe 804'). In some embodiments, the connecting tube (e.g., connecting tube 850 in FIG. 8) has a diameter smaller than the diameter of the inlet pipe. In some embodiments, the diameter of the connecting tube (e.g., connecting tube 850 in FIG. 8) should be large enough to have an appreciable effect on the pulse combustors, but small enough to not affect the fundamental nature of operation of a pulse combustor.

In some embodiments, two or more pulse combustors are operated in-phase. In some applications, such as those involving VTOL aircraft described above, arrays of pulse combustors are needed, and the ability to control the relative phases of the pulse combustors (or pulsejet engines) is essential for creating predictable force distributions across the array(s) and for creating predictable acoustic pressure fields around the combustor array(s) to control/reduce noise levels.

While the preceding description and explanation discussed two pulse combustors, the explanation can be extended to an array of more than two identical pulse combustors. In some embodiments, arrays of more than two identical pulse combustors can be operated in-phase if the combustion chamber of every pulse combustor in the array is connected to the combustion chambers of adjacent pulse combustors by means of short connecting tubes, using the same design criteria described for connecting tube 850 ($l \ll \lambda$), as shown, for example, in FIG. 10.

Figure 11B:
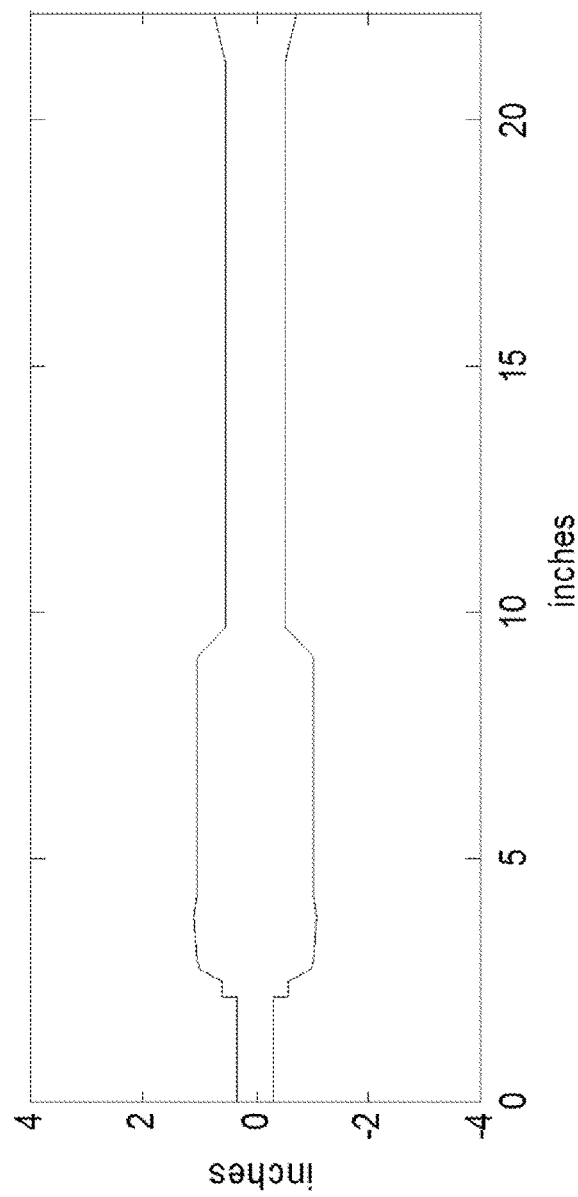
FIG. 11B shows dimensions of each of the engines used to obtain the data shown in FIG. 11A, according to some aspects of the present disclosure.

FIG. 11A shows a graph of normalized pressure versus time for two combustors operating in-phase, according to some aspects of the present disclosure. The graphs were obtained from experimental chambers shown in FIG. 11B. FIG. 11B shows dimensions of each of the engines used to obtain the results shown in FIG. 11A.

As seen in FIG. 11A, Engine 1 and Engine 2 exhibit sinusoidal or approximately sinusoidal pressure profiles that line up very closely. The profiles exhibit very little roughness.

Figure 12A:
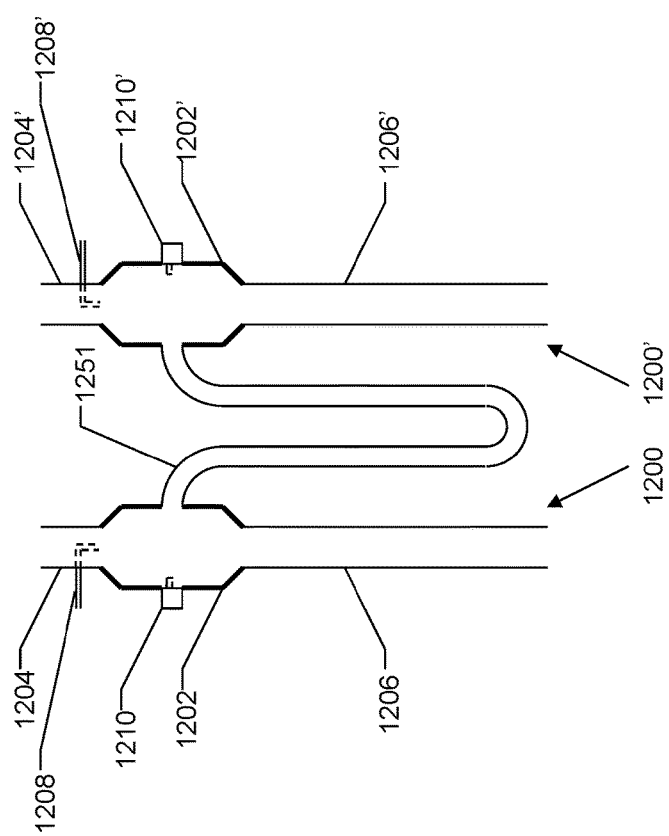
FIG. 12A is a setup of a pulse combustor arrangement with two pulse combustors 1200 and 1200' operating in anti-phase, according to some aspects of the present disclosure.

FIG. 12A shows a pulse combustor arrangement with two pulse combustors 1200 and 1200' operating in anti-phase, according to some aspects of the present disclosure. In FIG. 12A, pulse combustor 1200 includes an inlet pipe 1204 connected to a combustion chamber 1202. The combustion chamber 1202 is also connected to an exhaust pipe 1206. There is also a fuel injector 1208 located in the inlet pipe 1204, but other locations and geometries for the fuel injector 1208 are also possible. For example, it is also possible to place the fuel injector 1208 in the combustion chamber 1202. A spark plug 1210 may be located in the combustion chamber 1202 for starting the engine. Any other ignition means (such as a glow plug) can also be used instead of a spark plug.

Pulse combustor 1200' may include an inlet pipe 1204' connected to a combustion chamber 1202'. The combustion chamber 1202' is also connected to an exhaust pipe 1206'. There is also a fuel injector 1208' located in the inlet pipe 1204', but other locations and geometries for the fuel injector 1208' are also possible. For example, it is also possible to place the fuel injector 1208' in the combustion chamber 1202'. A spark plug 1201' is located in the combustion chamber 1202' for starting the engine. Any other ignition means (such as a glow plug) can also be used instead of a spark plug. The pulse combustor 1200' has the same physical dimensions as the pulse combustor 1200. A connecting tube 1251 connects combustion chamber 1202 with combustion chamber 1202'. The connecting tube 1251 is in fluid connection with the combustion chamber 1202 and the combustion chamber 1202'. Connecting tube 1251 in FIG. 12A is shown as bent (u-shaped), but the exact shape of connecting tube 1251 is not critical to the operation the pulse combustors as described herein.

In some embodiments, the length of the connecting tube 1251 may be half the wavelength, $\lambda$, of the stable mode of operation of the pulse combustor (e.g., 1200, 1200'). In other words, in some embodiments, the length of the connecting tube 1251 is nominally $\lambda/2$.

Figure 13A:
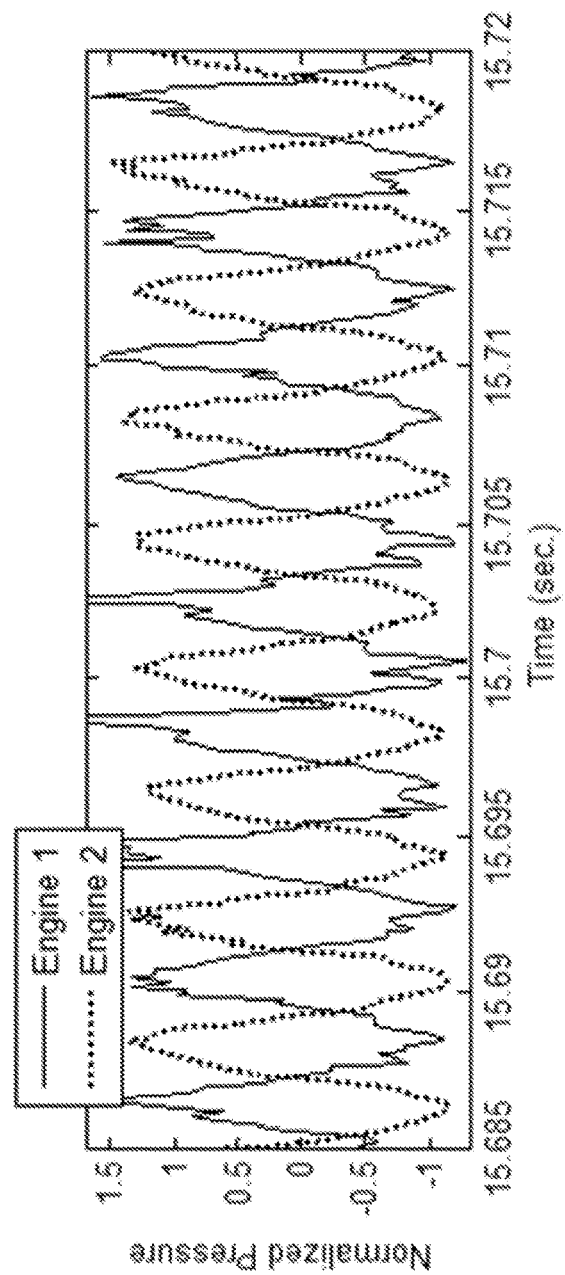
FIG. 13A is a plot of normalized pressure versus time from an experimental engine chamber with two pulsejet engines operating in anti-phase, according to some aspects of the present disclosure.

In some embodiments, the length of the connecting tube 1251 is half a wavelength, $\lambda/2$, (a tube with such a length is often referred to as an acoustic "half-wave tube"). If gas is allowed to move through the connecting tube 1251, it will result in an oscillation mode which is different from that which the engine prefers to operate at naturally (in isolation). This is because the connecting tube provides an additional avenue for gases to escape and/or enter the combustion chamber, which results in faster or slower emptying and filling of the combustion chamber, which corresponds to modes of oscillation different from the natural, isolated oscillation mode of a single engine. In some embodiments, the connecting tube 1251 will not admit any gas from, or expel any gas into, the combustion chambers if the pulse combustors operate at their natural, isolated operating modes/frequencies, but in anti-phase (180° out of phase). This is the stable operating mode of the coupled system, as has been experimentally verified, for example, as shown in FIG. 13A. The engines were connected by a 36 inch long, 0.25 inch diameter tube.

Figure 12B:
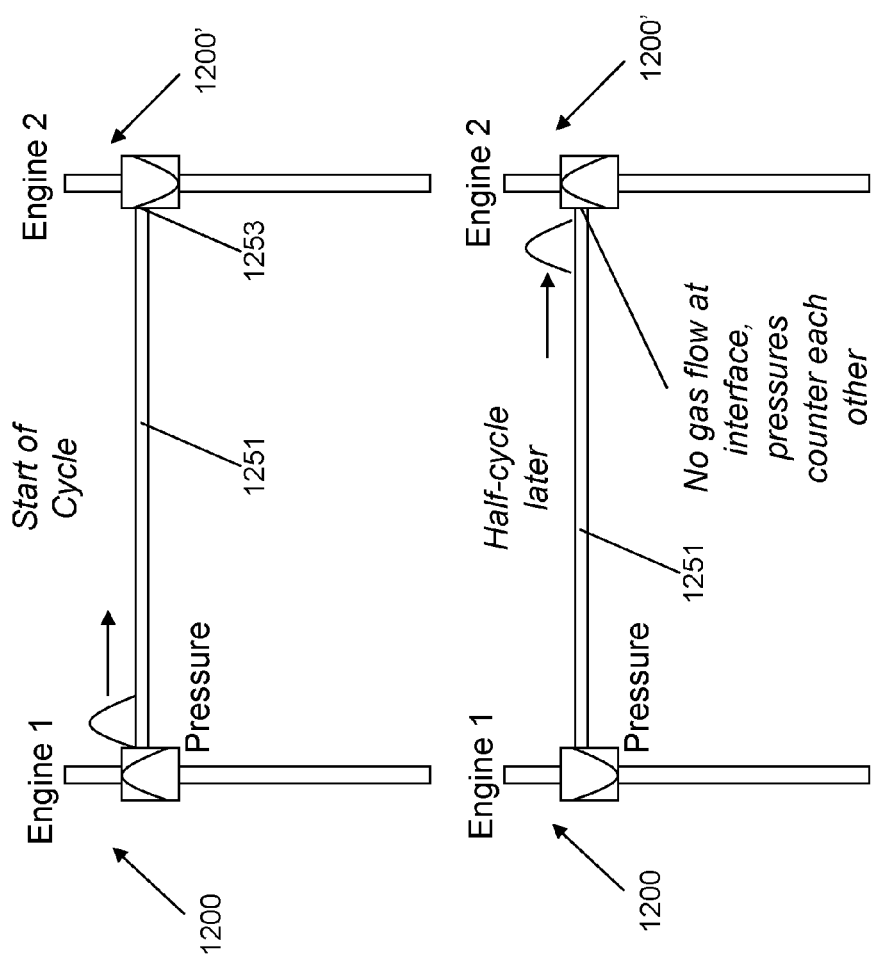
FIGS. 12B-12C are exemplary setups of two pulse combustors operating in anti-phase, according to some aspects of the present disclosure.
Figure 12C:
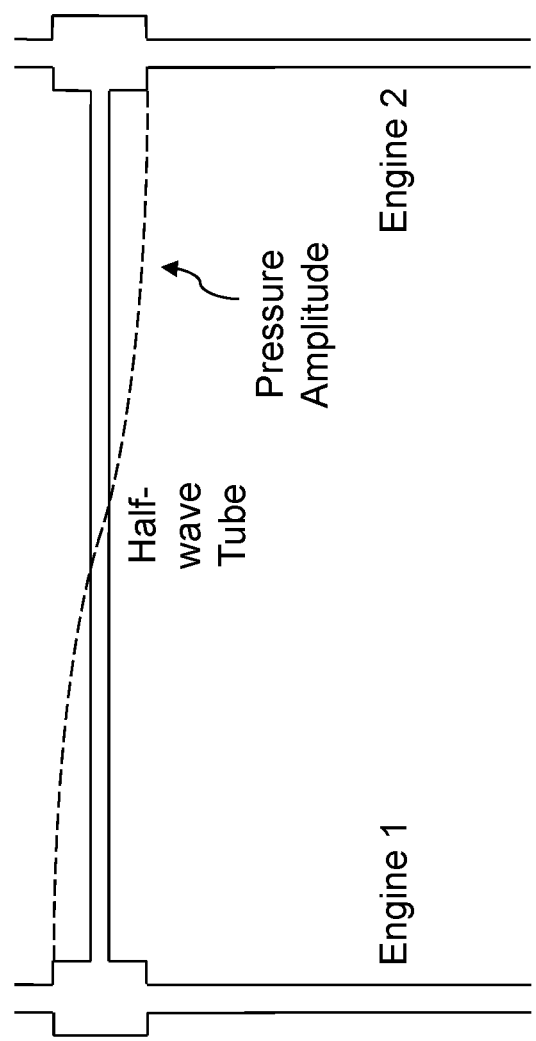

In other words, the stable mode is generally the one in which the connecting tube (e.g., 1251 of FIG. 12A) exchanges no gas with the combustion chambers (e.g., 1200 and 1200' of FIG. 12A). In some embodiments, this stable mode corresponds to the scenario where the connecting tube (e.g., 1251 of FIG. 12A) of length $\lambda/2$ accommodates half a periodic wave and the combustion chambers (e.g., 1202, 1202' of FIG. 12A) of the pulse combustors (e.g., 1200, 1200' of FIG. 12A) impose anti-phase pressure oscillations on either end of the connecting tube (e.g., 1251 of FIG. 12A). In some embodiments, the ends of the connecting tube (e.g., 1251 of FIG. 12A) constitute pressure antinodes, and the center of the connecting tube (e.g., 1251 of FIG. 12A) constitutes a pressure node. Acoustic principles then imply velocity nodes at the ends of the connecting tube as shown in FIG. 12C, which means that no gas is exchanged with the combustion chambers.

While in the ideal case, no gas would be exchanged between the combustion chambers (e.g., combustion chambers 1202 and 1202' in FIG. 12A) and the connecting tube (e.g., 1251 in FIG. 12A), non-ideal effects, such as viscosity, may cause deviations from ideal behavior. However, even when there are deviations from the ideal behavior, a tube with length $\lambda/2$ connecting the combustion chambers (e.g., combustion chambers 1202 and 1202' in FIG. 12A) of two pulse combustors (e.g., pulse combustors 1200 and 1200' in FIG. 12A) will cause the pulse combustors to operate in anti-phase, because this mode of operation minimizes the exchange of gas between the connecting tube and the combustion chambers.

In some embodiments, if two engines operating in anti-phase is the desired configuration, the engines need to be connected with a half-wave tube. Starting with a short connecting tube (length less than about $\lambda/8$), as the length of the connecting tube is increased, then eventually the connecting tube itself will become long enough to be able to absorb some of the gas in itself. For example, when the length of the connecting tube is short compared to the wavelength (e.g., less than about $\lambda/8$), such a tube could not accommodate any wave behaviour. However, in some embodiments, if the connecting tube is longer (e.g., longer than about $\lambda/8$), its length starts to become significant as compared to the wavelength, and the tube can therefore start accommodating wave behaviour, i.e. it can start internalizing the fluctuations it is exposed to at either end. In this case, a long tube of arbitrary length will not cause the engines to lock in anti-phase. In some embodiments, a tube having a length that is carefully selected/optimized will cause the engines to lock in anti-phase.

In some embodiments, the connecting duct is effectively a closed end for the engines operating in anti-phase. For example, engine 1 (1200) may be at the positive pressure part of its cycle (e.g., as shown in FIG. 12B). This sends a pulse of positive pressure down the connecting tube 1251. If this positive pressure pulse arrives at the positive pressure part the cycle of engine 2 (1200'), then no gas will be able to travel in/out from the connecting duct 1251 and out/in from engine 2 (1200'), because the pressure at that end 1253 of the connecting duct 1251 and in engine 2 1200' is the same. Basically, a high pressure inside engine 2 (1200') would like to send air into the connecting duct 1251, but the positive pressure pulse from engine 1 (1200) has arrived at just the right time and counters the high pressure from engine 2 (1200') (and vice versa). This makes the connecting duct 1251 look like a closed end and produces anti-phase operation. However, this may only possible if the length of connecting duct 1251 is half a wavelength so that the pulses are timed correctly.

Some embodiments discussed herein relate to designing pulsejet systems where two pulsejet engines operate in anti-phase. In some embodiments, there is no leakage of air from engine 1 to engine 2 because at the positive pressure part of engine 1's cycle (when the pulse was sent out by engine 1), a positive pressure arrives from engine 2, at just the right time to counter any flow into the connecting tube—the connecting tube is allowing pulses to travel both ways and constantly uses the pressure from one engine to stop air flow from one engine to the other.

In some embodiments, the engines will operate in anti-phase regardless of how the fuel is injected (e.g., constant or pulsed).

Long tubes exhibit their own oscillation modes, and a "half-wave tube" has a mode in which the ends oscillate at opposing pressures (e.g., as shown in FIG. 12C below). At the correct connecting tube length (e.g., $\lambda/2$), the frequency of this mode (in the connecting duct) is the same as the frequencies of the individual engines, and the pressure fluctuations at the ends of the tube keep any gas from coming into or out of the engines as long as they operate in anti-phase, which is why the engines prefer to naturally operate in anti-phase.

In some embodiments, the connecting tube (e.g., connecting tube 1251 in FIG. 12A) may have a diameter of approximately one-half of that of the inlet pipe 1204 (or inlet pipe 1204'). In some embodiments, the connecting tube (e.g., connecting tube 1251) has a diameter smaller than the diameter of the inlet pipe (e.g., inlet pipe 1204 or 1204' in FIG. 12A). In some embodiments, the diameter of the connecting tube (e.g., connecting tube 1251 in FIG. 12A) should be large enough to have an appreciable effect on the pulse combustors (e.g., pulse combustor 1200 or 1200' in FIG. 12A), but small enough to not affect the fundamental nature of operation of a pulse combustor. In some embodiments, the diameter of the connecting tube is determined empirically.

In some embodiments, arrangements where two pulse combustors (e.g., 1200, 1200' in FIG. 12A) are connected via a connecting tube (e.g., connecting tube 1251 in FIG. 12A) to operate in anti-phase provide advantages over a single or conventional pulse combustor. In some embodiments, single pulse combustors may have an intermittent operation which causes oscillatory flows and pressure variations. This may result in high noise and vibration levels. In some embodiments, two pulse combustors operate 180° out of phase, which causes the oscillation due to one pulse combustor to be countered by the oscillation due to the other. In some embodiments, the anti-phase oscillations of the two pulse combustors result in destructive interference, which results in less vibration and lower noise levels, as compared to a single, conventional pulse combustor or two uncoupled pulse combustors.

FIG. 13A is a plot of normalized pressure versus time from an experimental engine chamber with two pulsejet engines operating in anti-phase, according to some aspects of the present disclosure. In some embodiments, anti-phasing cancels a low frequency fundamental component to which the human ear is relatively insensitive. Accordingly, in some embodiments, anti-phasing results in a sharp drop in signal amplitude, but provides a perceived noise reduction of an additional 2-3 dBA versus the modified engine noise measurements shown in FIG. 14B. However, anti-phasing has a significant effect on decreasing vibration levels, which cannot be quantified with A-weighting.

Figure 13B:
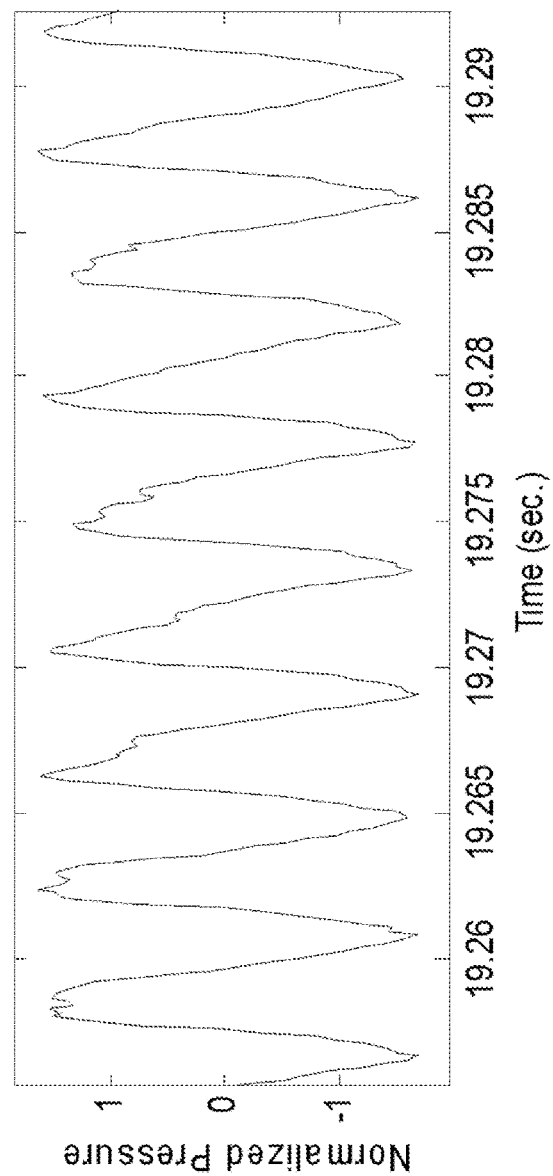
FIG. 13B is a plot of normalized pressure versus time for an exemplary single engine having dimensions that are the same as for the engine shown in FIG. 13A, according to some aspects of the present disclosure.

FIG. 13B is a plot of normalized pressure versus time from an experimental engine chamber with a single pulsejet engine having the same dimensions as the pulsejet engines shown in FIG. 13A. The dimensions of the pulsejet engines used to obtain the data shown in FIGS. 13A-B are the same as the dimensions of the pulsejet shown in FIG. 11B. The measurements for the pulsejet engine shown in FIG. 13B were made using a pressure sensor connected at the combustion chamber.

Figures 14A, 14B, 14C:
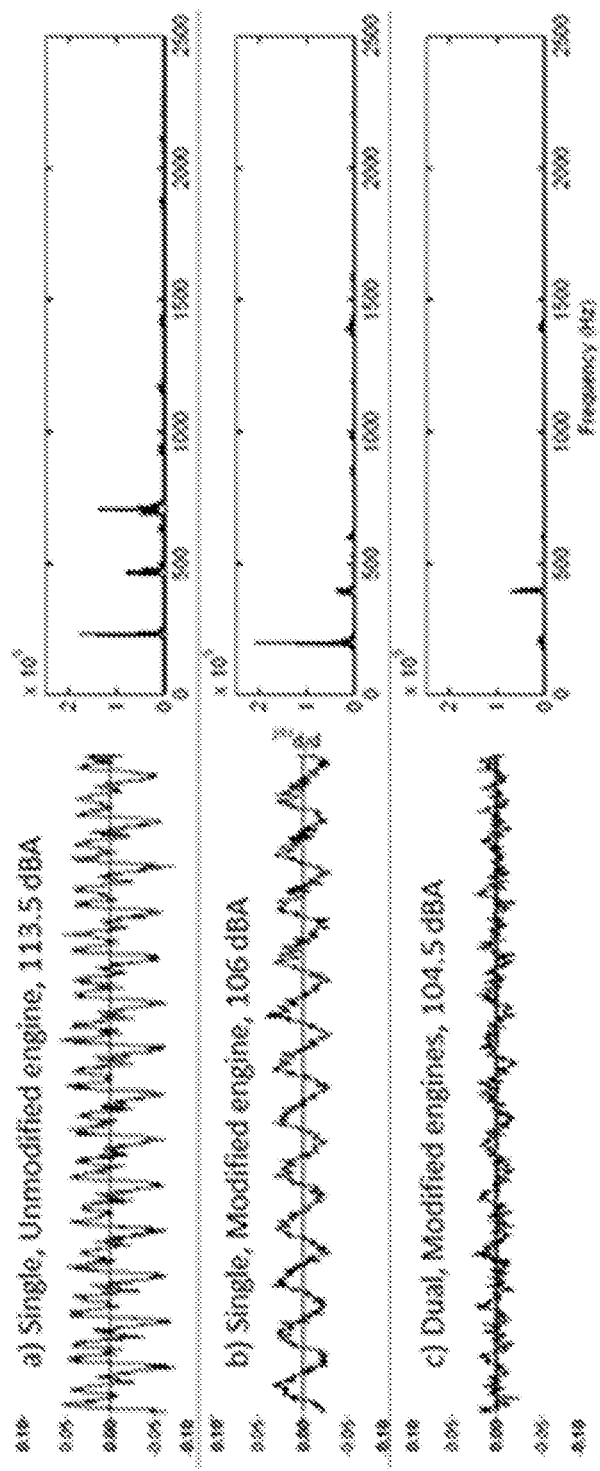
FIGS. 14A-C are plots of waveforms versus time from a microphone signal (left side) and fast Fourier transform (FFT) of the signal on the left side for various pulsejet engine configurations, according to some aspects of the present disclosure.

FIGS. 14A-C are plots of waveforms versus time from a microphone signal (left side) and fast Fourier transform (FFT) of the signal on the left side for various pulsejet engine configurations, according to some aspects of the present disclosure. The left side of FIG. 14A is a plot of waveform versus time from a microphone signal of a single, unmodified pulsejet engine, giving noise at a level of 113.5 dBA. The waveform profile in FIG. 14A is rough and includes multiple sharp peaks over a single firing cycle. As seen in the FFT image on the right side of FIG. 14A, there is significant harmonic content as there are multiple peaks after the first large peak, indicating undesired modes of oscillation. The high frequency content and signal roughness generally arise because the uncontrolled combustion process excites multiple oscillation modes inside the engine, which is like an acoustic duct. The roughness of the signal generally produces most of the perceived noise. A typical large valveless pulsejet fires at approximately 100 Hz, a low frequency that the human ear is quite insensitive to, but these pulsejets are still considered to be very loud, which is due to the roughness of the signal, which adds significant high-frequency content to the signal that humans can hear very well. The dimensions and setup of the engine shown in FIG. 14A are the same as those shown for the engine in FIG. 7F.

The FFT (Fast Fourier Transform, or essentially just the Fourier Transform) for the noise signals is indicative of the distribution of energy across the spectrum of frequencies. If the waveform were a perfect sinusoid, the FFT would show a single peak at the frequency of the sinusoid. But instead, the waveform is jagged and displays multiple peaks over the course of a firing cycle (e.g., as shown in FIG. 14A), which means that the energy is not just in the fundamental mode (which corresponds approximately with the first FFT peak), but that the energy is also spread into the higher frequencies due to the jagged-ness and multiple peaking, resulting in the peaks at higher frequencies in FIG. 14A.

Figure 14D:
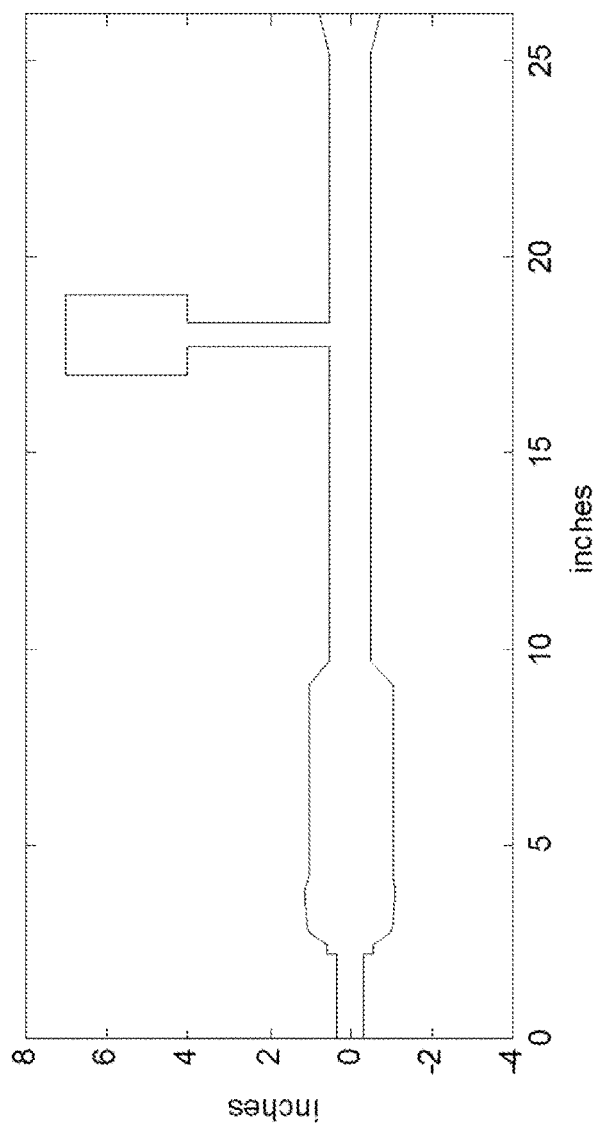
FIG. 14D shows dimensions of the engine with a Helmholtz resonator that was used to obtain the data shown in FIG. 14B according to some aspects of the present disclosure.
Figure 14E:
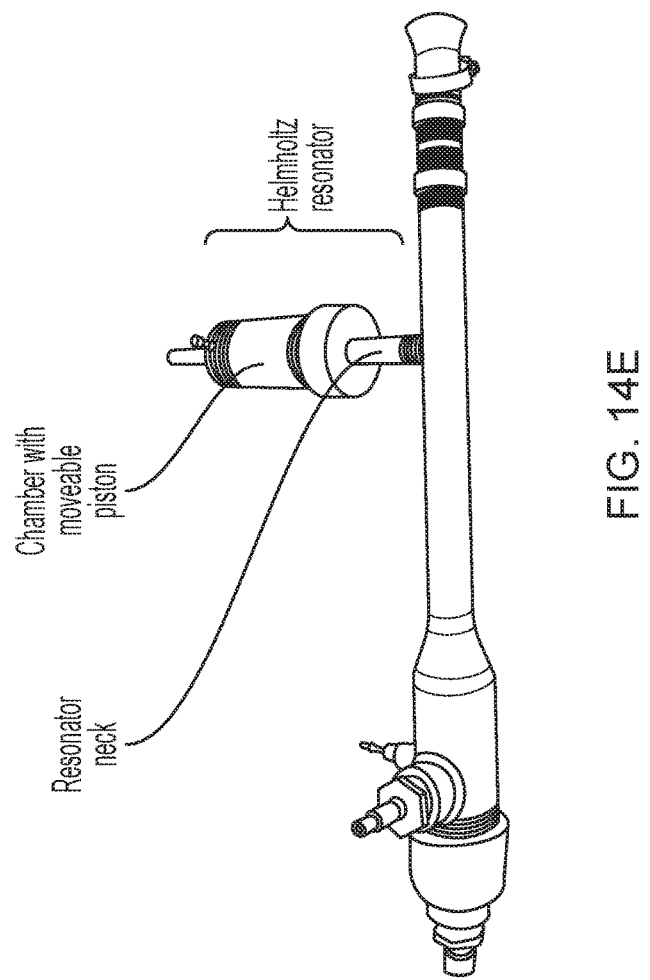
FIG. 14E is a photograph of the engine shown in FIG. 14D, according to some aspects of the present disclosure.

FIG. 14B (left) is a plot of waveform versus time from a microphone signal of a single, modified pulsejet engine, giving noise at a level of 106 dBA. As seen in FIG. 14B, the amplitude of the signal is significantly lower than in FIG. 14A; moreover, the FFT plot on the right side shows one large fundamental peak, and significantly smaller additional peaks, indicating significant reduction in harmonic/high frequency content as compared to FIG. 14A. The removal of harmonic/high frequency content results in a noise reduction of about 7.5 dBA as compared to the unmodified engine, which is a significant reduction. A reduction of 10 dBA is generally accepted to be subjectively half as loud. The dimensions of the engine in FIG. 14B are the same as those shown for the engine in FIG. 7F, but the engine has a Helmholtz resonator attached to the exhaust/tailpipe, as shown in FIG. 14D. The Helmholtz resonator has a chamber volume of 10.4 in$^3$ and a height of 3 inches (e.g., as for the engine shown in FIG. 7D above). FIG. 14E is a photograph of an engine with a Helmholtz resonator as shown in FIG. 14D.

In FIG. 14B, the FFT waveform is much smoother or 'cleaner' than that seen in FIG. 14A, and it can be seen that the high-frequency content has been largely removed. This can also be seen in the FFT where the peaks at higher frequency have been greatly diminished, and only a strong fundamental remains—this indicates that the energy is largely concentrated at a single frequency, resulting in a smooth waveform.

FIG. 14C (left) is a plot of waveform versus time from a microphone signal of a dual modified pulsejet engine setup, operating in anti-phase, giving noise at a level of 104.5 dBA. As seen in FIG. 14C, operating the modified engines in anti-phase results in further reduction in signal amplitude compared to the signal in FIG. 14B. Further, operating the modified engines in anti-phase as shown in FIG. 14C results in an additional noise reduction of about 1.5 dBA. Further, operating the modified engines in anti-phase as shown in FIG. 14C results in significant reduction in vibrations. The arrangement shown in FIG. 14C results in a noise reduction of 9 dBA as compared with a single, unmodified pulsejet (FIG. 14A), which is a significant reduction.

In FIG. 14C, the effect of anti-phasing two engines is to cause destructive cancellation of the base/fundamental signal, and it can be seen in the FFT plot that the fundamental component/peak has essentially been eliminated because of this—it essentially means that there is little to no energy at this base/fundamental frequency anymore because it has all been cancelled by the anti-phasing effect. A small high-frequency peak can be seen at ~400 Hz. This peak arises because the signals from FIG. 14B are not perfect sinusoids—they are close to being perfectly sinusoidal, but are not actually perfect, and the imperfections keep the signals from cancelling perfectly. The result is that some high-frequency content survives and can actually add to produce a small peak at some higher frequency, which is what is seen in FIG. 14C. However, the overall noise levels still decrease, and as the quality of the modified signal (FIG. 14B) improves, the quality of the cancellation improves and the possibility of any higher-frequency peaks decreases. In FIG. 14C, two identical engines (e.g., each as shown in FIG. 14B) are connected via a 42 inch long, 0.25 inch-diameter tube for anti-phase operation.

Figure 14F:
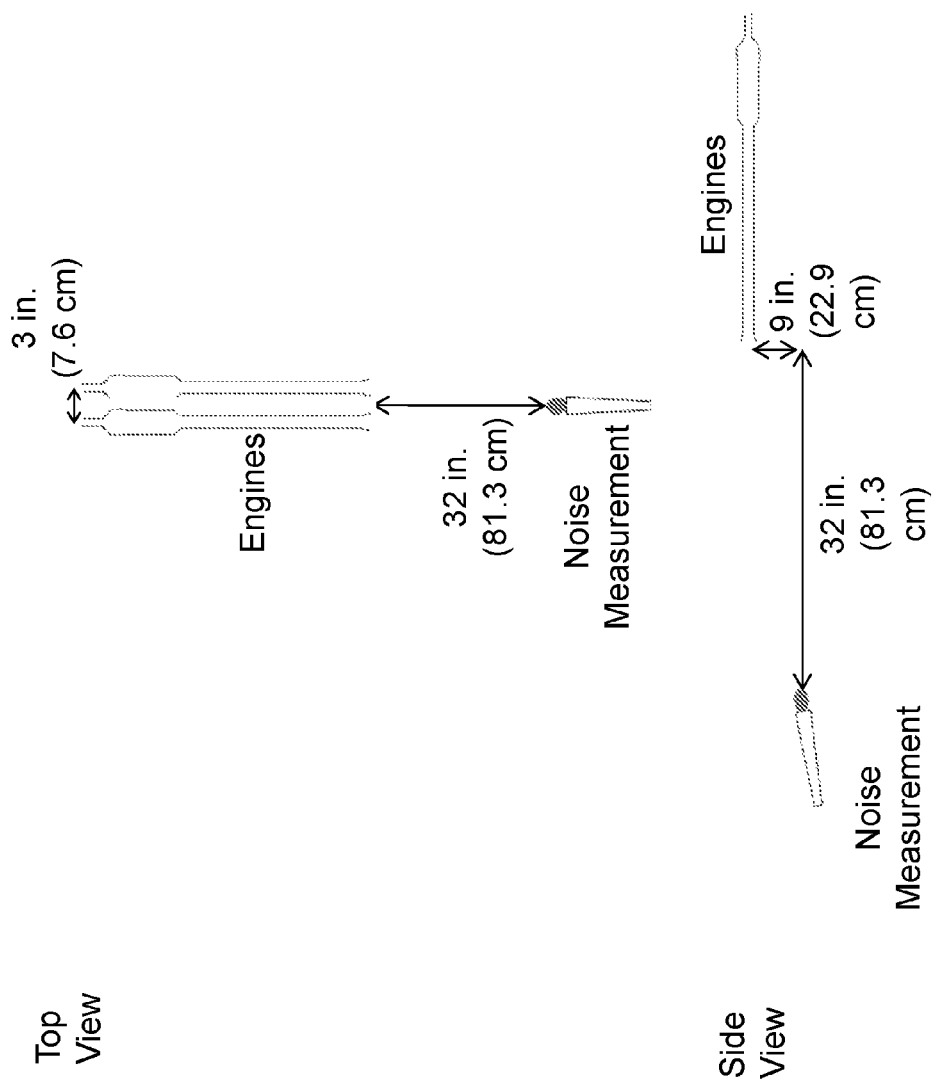
FIG. 14F shows two exemplary views of a setup used to make noise measurements for the data shown in FIGS. 14A-14C, according to some aspects of the present disclosure.

FIG. 14F includes two views of an experimental setup used for the noise measurements of two engines operating in anti-phase.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is contemplated that systems, devices, methods, and processes of the claimed disclosure encompass variations and adaptations developed using information from the embodiments described herein. Adaptation and/or modification of the systems, devices, methods, and processes described herein may be performed by those of ordinary skill in the relevant art.

Throughout the description, where articles, devices, and systems are described as having, including, or comprising specific components, or where processes and methods are described as having, including, or comprising specific steps, it is contemplated that, additionally, there are articles, devices, and systems of the present disclosure that consist essentially of, or consist of, the recited components, and that there are processes and methods according to the present disclosure that consist essentially of, or consist of, the recited processing steps.

It should be understood that the order of steps or order for performing certain action is immaterial so long as the disclosure remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed:

1. A pulse combustor system, comprising:
   a first pulse combustor, comprising a combustion chamber, an inlet pipe, an exhaust pipe, and a first fuel injector for injecting fuel into the combustion chamber at a fuel supply rate, wherein the first pulse combustor has a fundamental oscillation mode and one or more additional oscillation modes; and a combination of:
   at least one pressure sensor for measuring a pressure inside the first pulse combustor, wherein if the pressure is above a predetermined pressure value, the at least one pressure sensor sends a signal to a controller to adjust the fuel supply rate to the first pulse combustor to reduce excitation of the one or more additional oscillation modes; and
   a first fluid velocity sensor disposed at the inlet pipe at a pressure node for measuring a first fluid velocity at the inlet pipe and a second fluid velocity sensor disposed at the exhaust pipe at a pressure node for measuring a second fluid velocity at the exhaust pipe, wherein if the first fluid velocity and/or the second fluid velocity is above a predetermined fluid velocity value, the first and/or the second fluid velocity sensor sends another signal to the controller to adjust the fuel supply rate to the first pulse combustor to reduce excitation of the one or more additional oscillation modes.

2. The pulse combustor system of claim 1, comprising a second fuel injector for injecting fuel into the combustion chamber.

3. The pulse combustor system of claim 2, wherein a first pressure sensor reduces excitation of a first additional oscillation mode of the one or more additional oscillation modes, the first pressure sensor being located at a pressure anti-node of the first additional oscillation mode.

4. The pulse combustor system of claim 3, wherein the fuel supply rate corresponds to a frequency of the fundamental oscillation mode, wherein the controller superimposes a first pulsing profile on the fuel supply rate, the first pulsing profile corresponding to a first frequency of the first additional oscillation mode.

5. The pulse combustor system of claim 3, wherein the controller adjusts a second fuel supply rate of the second fuel injector to correspond to a first frequency of the first additional oscillation mode.

6. The pulse combustor system of claim 1, comprising at least one of the first and the second fluid velocity sensors, wherein if the first fluid velocity and/or the second fluid velocity is above the predetermined fluid velocity value, at least one of the first and/or the second fluid velocity sensor sends a signal to the controller to adjust the fuel supply rate to the first pulse combustor to reduce excitation of the one or more additional oscillation.

7. The pulse combustor system of claim 6, wherein the first fluid velocity sensor and/or the second fluid velocity sensor reduces excitation of a second additional oscillation mode of the one or more additional oscillation modes, at least one of the first and the second fluid velocity sensors being located at a velocity anti-node of the second additional oscillation mode.

8. The pulse combustor system of claim 7, wherein the fuel supply rate corresponds to a frequency of the fundamental oscillation mode, wherein the controller superimposes a second pulsing profile on the fuel supply rate, the second pulsing profile corresponding to a second frequency of the second additional oscillation mode.

9. The pulse combustor system of claim 7, wherein the controller adjusts the second fuel supply rate of the second fuel injector to correspond to a second frequency of the second additional oscillation mode.

10. The pulse combustor system of claim 6, wherein the first fluid velocity sensor is located at the inlet pipe and the second fluid velocity sensor is located at the exhaust pipe.

11. The pulse combustor system of claim 1, comprising a resonator tuned to a third frequency of a third of the one or more additional oscillation modes, the resonator attenuating the third frequency of operation of the first pulse combustor.

12. The pulse combustor system of claim 11, wherein the resonator is a Helmholtz resonator or a quarter-wave tube.

13. The pulse combustor system of claim 11, wherein the resonator is attached to the exhaust pipe.

14. The pulse combustor system of claim 11, wherein the resonator is located at a pressure anti-node of the third of the one or more additional oscillation modes.

15. A pulse combustor system, comprising:
    the first pulse combustor arranged as in claim 1;
    a second pulse combustor arranged as the first pulse combustor; and
    a tube connecting the first pulse combustor to the second pulse combustor the tube being attached at a first end to the first pulse combustor combustion chamber and at a second end to the second pulse combustor combustion chamber, wherein the tube has a length that is less than or equal to $\frac{1}{8}^{th}$ of a wavelength of the fundamental oscillation mode.

16. The pulse combustor system of claim 15, wherein the length of the tube causes the first pulse combustor and the second pulse combustor to operate in-phase.

17. The pulse combustor system of claim 15, wherein the length of the tube prevents air flow between the first pulse combustor and the second pulse combustor during operation of the pulse combustor system.

18. The pulse combustor system of claim 15, comprising three or more pulse combustors, wherein each of the three or inure pulse combustors is arranged as the first pulse combustor, and wherein each of the three or more pulse combustors is connected to one or two pulse combustors of the three or more pulse combustors by another tube arranged as the tube.

19. A pulse combustor system, comprising:
    a first pulse combustor, comprising a combustion chamber, an inlet pipe, an exhaust pipe, and a first fuel injector for injecting, fuel into the combustion chamber at a fuel supply rate, wherein the first pulse combustor has a fundamental oscillation mode and one or more additional oscillation modes;

a first resonator attached to the first pulse combustor, the first resonator having dimensions selected such that a first resonant frequency of the first resonator corresponds to a first frequency of a first oscillation mode of the one or more additional oscillation modes, wherein the first resonator reduces excitation of the first oscillation mode; and a first fluid velocity sensor disposed at the inlet pipe at a pressure node for measuring a first fluid velocity at the inlet pipe and a second fluid velocity sensor disposed at the exhaust pipe at a pressure node for measuring a second fluid velocity at the exhaust pipe, a controller to adjust the fuel supply rate based on a signal from the first or second fluid velocity sensor.

20. The pulse combustor system of claim 19, wherein the first resonator is attached to the first pulse combustor at a location corresponding to a pressure anti-node of the first oscillation mode.

21. The pulse combustor system of claim 20, comprising a second resonator attached to the first pulse combustor, the second resonator having dimensions selected such that a second resonant frequency of the second resonator corresponds to a second frequency of a second oscillation mode of the one or more additional oscillation modes, wherein the second resonator reduces excitation of the second oscillation mode, wherein the second resonator is attached to the first pulse combustor at a location corresponding to a pressure anti-node of the second oscillation mode.

22. A pulse combustor system, comprising:
a first pulse combustor, comprising a first combustion chamber, a first inlet pipe, a first exhaust pipe, and a first fuel injector for injecting fuel into the combustion chamber;
a second pulse combustor, comprising a second combustion chamber, a second inlet pipe, a second exhaust pipe, and a second fuel injector for injecting fuel into the combustion chamber, the first pulse combustor and the second pulse combustor having a fundamental oscillation mode and one or more additional oscillation modes when operated in isolation;
a tube connecting the first pulse combustor combustion chamber to the second pulse combustor combustion chamber, wherein the tube has a length that is less than or equal to $\frac{1}{8}^{th}$ of a wavelength of the fundamental oscillation mode; and
a first fluid velocity sensor disposed at the first inlet pipe at a pressure node for measuring a first fluid velocity at the first inlet pipe and a second fluid velocity sensor disposed at the first exhaust pipe at a pressure node for measuring a second fluid velocity at the first exhaust pipe, a controller to adjust a fuel supply rate based on a signal from the first or second fluid velocity sensor.

23. The pulse combustor system of claim 22, wherein the first pulse combustor comprises a first resonator attached thereto and the second pulse combustor comprises a second resonator attached thereto, the first resonator being identical to the second resonator.

24. The pulse combustor of claim 23, wherein each of the first resonator and the second resonator have dimensions selected such that a resonant frequency of the first and the second resonator corresponds to a first frequency of a first oscillation mode of the one or more additional oscillation modes, wherein each of the first and the second resonator reduces excitation of the first oscillation mode.

25. The pulse combustor of claim 24, wherein the first resonator is attached to the first pulse combustor at a location on the first pulse combustor corresponding to a pressure anti-node of the first oscillation mode and wherein the second resonator is attached to the second pulse combustor at a location on the second pulse combustor corresponding to a pressure anti-node of the first oscillation mode.

* * * * *

UNITED STATES PATENT AND TRADEMARK OFFICE
CERTIFICATE OF CORRECTION

PATENT NO. : 10,473,058 B2
APPLICATION NO. : 15/074609
DATED : November 12, 2019
INVENTOR(S) : Daanish Maqbool Page 1 of 1

It is certified that error appears in the above-identified patent and that said Letters Patent is hereby corrected as shown below:

In the Claims

Please correct Claim 18 to read as:
The pulse combustor system of claim 15, comprising three or more pulse combustors, wherein each of the three or more pulse combustors is arranged as the first pulse combustor, and wherein each of the three or more pulse combustors is connected to one or two pulse combustors of the three or more pulse combustors by another tube arranged as the tube.

Signed and Sealed this
Third Day of March, 2020

Andrei Iancu
*Director of the United States Patent and Trademark Office*